(12) United States Patent
Lippold

(10) Patent No.: US 6,685,833 B2
(45) Date of Patent: Feb. 3, 2004

(54) FLUID FILTER ELEMENT

(75) Inventor: Hans-Joachim Lippold, Berlin (DE)

(73) Assignee: LPD Technologies, Inc., Miami, FL (US)

( * ) Notice: Subject to any disclaimer, the term of this patent is extended or adjusted under 35 U.S.C. 154(b) by 78 days.

(21) Appl. No.: 09/960,549

(22) Filed: Sep. 20, 2001

(65) Prior Publication Data

US 2002/0033224 A1 Mar. 21, 2002

(30) Foreign Application Priority Data

Sep. 21, 2000 (DE) .......................................... 100 48 223
Mar. 15, 2001 (DE) .......................................... 101 13 077

(51) Int. Cl.$^7$ ............................................. B01D 29/21
(52) U.S. Cl. ................. 210/493.1; 210/493.3; 210/493.5; 210/506; 55/521; 55/497; 55/DIG. 5; 428/181; 428/182
(58) Field of Search .......................... 210/493.1, 493.3, 210/493.5, 506; 55/521, 497, DIG. 5; 428/181–182

(56) References Cited

U.S. PATENT DOCUMENTS

| | | | | |
|---|---|---|---|---|
| 3,531,920 A | * | 10/1970 | Hart | ............................ 55/497 |
| 4,144,369 A | * | 3/1979 | Wass | ........................... 428/183 |
| 5,053,131 A | * | 10/1991 | Lippold | .................... 210/493.5 |
| 5,066,400 A | * | 11/1991 | Rocklitz et al. | ......... 210/493.5 |
| 5,089,202 A | * | 2/1992 | Lippold | ...................... 264/145 |
| 5,290,447 A | | 3/1994 | Lippold | |
| 5,609,761 A | * | 3/1997 | Franz | ...................... 210/493.1 |
| 5,804,014 A | | 9/1998 | Kahler | |
| 5,888,262 A | | 3/1999 | Kahler | |

FOREIGN PATENT DOCUMENTS

DE 19755466 6/1999

\* cited by examiner

Primary Examiner—Joseph Drodge
Assistant Examiner—Marianne Ocampo
(74) Attorney, Agent, or Firm—Bachman & LaPointe

(57) ABSTRACT

A fluid filter element is provided which is formed from an embossed flat filter material which is folded so as to define a plurality of substantially adjacent walls, each wall having an embossing having a first embossing portion which extends from one side of the wall and a second embossing portion which is adjacent to the first embossing portion and which extends from the other side of the wall, and an adhesive connecting adjacent embossings of adjacent walls, the adhesive having a substantially constant height. Additional embossings can also be provided. A method for forming the fluid filter element is also provided.

25 Claims, 21 Drawing Sheets

FLUID FILTER ELEMENT

BACKGROUND OF THE INVENTION

1. Field of the Invention

The invention concerns a fluid filter element and method for forming same.

2. Description of Prior Art

Fluid filter elements are well known and are widely used in fluid filters for varying areas of use, including hydrodynamic machines and air-conditioning engineering. Their meander-shaped or zig-zag structure provides a substantially increased filter area, in relation to a fixed afflux flow cross-section. In order to fix the fold walls of such a structure relative to each and to support them with respect to each other, various different kinds of design configurations have been developed. Filters with depressions which are embossed into the flat filter material and which, when the material is folded, bear against each other and support each other are known.

In the case of earlier fluid filter elements of that kind the embossings of the fold walls were simply laid against each other when executing the folding operation and the filter element which was finished as a kind of "fold pack" was externally fixed by being clamped in a box or frame. While such particularly simple fluid filter elements certainly operate satisfactorily at the beginning of their period of use and in areas of use without involving fluctuating pressure loadings worth mentioning, critical stability problems are found to occur in relation to certain degrees of filling with deposited dust particles, or dust loading, and in particular when used in relation to fluid-dynamic machines.

A relatively long time ago, therefore, the inventor proposed a filter structure in which the mutually facing embossings of the filter material are glued to each other, in the folded condition, on their respective top sides. The gluing operation is implemented by a selective thin application of adhesive or suitable impregnation of the filter material in the region of the embossings. Such a filter structure is described for example in U.S. Pat. No. 5,290,447.

In connection with rising demands on the part of users in terms of performance and service life of the fluid filter elements, there was a trend for an increase in the fold height, which at the same time results in an increase in the maximum spacing of the filter material surfaces from each other. In that respect, difficulties arose in regard to implementing those increasing spaces solely by increasing the depth of the embossing regions which support the fold walls relative to each. In particular, with embossings which are of an increasing depth, there is an increased risk of through-embossings or piercings, holes or at least very thin areas in the filter material. Fluid filter inserts with such piercings are rejects.

Therefore, in a further stage in development, the proposal was made that, instead of an application of adhesive without a thickness worth mentioning on the top sides of the embossings, adhesive threads of considerable thickness should be applied, which together with the embossings afford the required maximum spacing between the fold walls from the filter material. That structure is described for example in U.S. Pat. No. 5,804,014.

In a next step in development—the inventor proposed to use a structure which is controlled variably in respect of its height (specifically rising linearly towards the opening of the folds), in particular also entirely without any embossing or at any event without embossing which is variable in respect of its depth, in the filter material. This therefore involves fluid filter elements in which the spacing function and the supporting function as between the fold walls of a zig-zag fold configuration is achieved substantially solely by adhesive threads which are variable in height. That structure is described for example in DE 197 55 466 A1.

In the above-mentioned fluid filter structures, depressions and raised portions are embossed into the filter material alternately in the widthwise direction of the filter material and in a direction perpendicularly to the fluid flow direction and parallel to the material surface, so that (in the folded condition of use) support regions are disposed alternately at both sides of the filter medium. In a situation involving long-term use of those filter structures under high levels of loading, in particular in fluid filters for fluid dynamic machines which entail a pronounced fluctuating pressure loading, and also in the case of filters for suspended matter or mechanical filters which can be cleaned off, problems arose with reliability.

In particular, it is observed that the filter medium in such devices can be torn away from the adhesive threads under a high loading. The filter medium can also be delaminated in a layer-wise fashion. The reason for this is that the boundary layer between the adhesive thread and filter medium is subjected to a heavy tensile loading on the feed air or upstream side. In the regions where the filter medium has come away from the adhesive thread, it begins to "flutter". The entire filter element then becomes unstable from the fluid dynamics point of view, the folds on the discharge air or downstream side collapse, and enormous pressure difference rises occur which can reach a level practically involving local air impermeability of the filter. As the ultimate effect, the filter is destroyed.

Therefore, in an unpublished German patent application, the inventor proposed a specially reinforced structure for high-efficiency fluid filters of that kind. It is provided in that structure that, in all embossing regions, the filter material fold walls are not only glued to each other on the mutually facing raised portions, but in addition a particularly high adhesive thread is provided in lateral orientation with those adhesive means—that is to say in the depressions on the rearward surface of the filter material, which depressions correspond to the raised portions. In that structure the filter material is therefore "clamped in position" on both sides between adhesive threads in all gluing regions.

A technological problem of this last-mentioned arrangement however is that the adhesive threads must be formed of very great height, in the depressions in the filter material. When using conventional hot melt adhesives and manufacturing installations, relatively wide adhesive threads are also formed in that situation, which detrimentally reduce the usable filter area. In particular the amounts of adhesive become so great that, in the case of the adhesive threads which are to be applied on the underside of the web of filter material, the hot melt adhesive drips out before it hardens. The usual application of adhesive to the horizontal disposed filter material, which is advantageous from the point of view of the apparatus configuration, is thus no longer possible. In addition, the application of controlled adhesive threads to both sides of a filter medium is in any case technologically demanding and presupposes the use of metering devices which operate precisely and which are correspondingly expensive.

FIGS. 1–6 further illustrate various prior art structures and problems.

Referring to FIG. 1, shown therein is an isometric view of a part of a filter material 10 in a lying condition, for the production of a fluid filter element in accordance with the prior art; embossed into the filter material 10 on both sides of the plane of the material are depressions and raised portions respectively as indicated at 11, which are approximately triangular in longitudinal section, that is, they extend longitudinally at an angle with respect to the plane of the material, and between approximately trapezoidal and rectangular in cross-section, typically in a soft curve, which extends in the longitudinal direction of the filter material web. Reference numeral 13 denotes fold edges which extend perpendicularly thereto and which are also embossed into the filter material. The embossings 11 extend virtually over the entire spacing "a" between adjacent fold edges 13 and embossing height is illustrated at "$b_1$".

FIG. 2 is a diagrammatic isometric view of a part of a prior art fluid filter element 20 which is produced by folding a pre-treated filter material of the kind shown in FIG. 1. The embossings 21 are somewhat more rounded in the longitudinal direction than the embossings 11 shown in FIG. 1. The folding procedure results in a filter element with a fold height "a'" which, by virtue of the wedge angle of the V-shaped folds, is slightly smaller than the spacing "a" of the pre-embossed fold as shown on FIG. 1. The maximum fold spacing "$c_1$" between laterally adjacent fold edges 23 is somewhat greater than double the embossing height "$b_1$". Since, as can be clearly seen from FIG. 2, the embossings 21 bear directly against each other with their top sides even in an adhesively joined structure, the spacing between adjacent fold walls 25 is afforded solely by the embossings 21.

FIG. 3 is a diagrammatic view in cross-section showing the structural principle of a further known fluid filter element 30. In this case also a filter medium 30' is provided with embossings 31 which project alternately towards both sides. In this case the embossings are of a semicircular configuration in cross-section. The material is laid in folds along pre-embossed fold lines 33a, 33b (in which respect those references distinguish upper and lower edges of the folds of the folded configuration formed from each other).

In this case however, prior to the folding operation, relatively thick adhesive threads 37 which are also approximately semicircular in cross-section are applied. In the folding operation, while in the condition of not yet having hardened, the adhesive threads 37 come into contact with each other and are joined to each other. The fold walls 35 made up of the filter material 30' are also connected together by way of the adhesive threads, more specifically with a fold spacing "$c_2$" which is substantially greater than double the embossing depth "$b_2$". Arrows $A_1$ and $A_2$ respectively indicate into which fold openings feed or upstream air flows ($A_1$) and out of which openings exhaust or downstream air is discharged ($A_2$).

FIGS. 4a through 4c illustrate in a sketch fashion the loading characteristic of a prior art fluid filter element of this kind, wherein (in spite of the slightly differing geometry of the arrangements), the reference numerals from FIG. 3 have been adopted. FIG. 4a shows a prior art "virgin" filter geometry at the beginning of the period of use, FIG. 4b (prior art) shows a condition with the beginning of fold deformation after the fold walls which in the feed air region are subjected to a high tensile loading have torn away from the adhesive threads, and FIG. 4c shows the condition involving major or continual loading in which the fold deformation is already far advanced and is irreversible and such as to have an adverse effect on function.

FIGS. 5a and 5b diagrammatically show two mutually similar fluid filter elements 50A and 50B, in which additional stabilization is provided to prevent the detachment and deformation phenomena which are diagrammatically illustrated in FIGS. 4b and 4c. The references used in these Figures are based on those employed in FIG. 3 so that there is no need for further description in this respect. The shape of the embossings 51 and the adhesive threads 57 also corresponds to the embodiment shown in FIG. 3.

The essential difference lies in the provision of additional adhesive threads 58 on the underside of the raised embossings 51, that is to say in the depression respectively corresponding to a raised portion. It can be clearly seen from both Figures that naturally those adhesive threads 58 must be of a much greater height than the adhesive threads 57 arranged on the raised portions, in order to be able to bridge over the spacing between the fold walls 55 (that spacing being much greater in the recesses), when they are brought into contact with each other in the folding operation. The difference between the filter elements 50A and 50B is that in the case of the former the additional adhesive threads 58 are provided only in every second adhesive region, while in the latter they are provided in all adhesive regions.

FIG. 6 is once again a view in longitudinal section showing an embodiment of a known filter design principle which is diagrammatically illustrated in a cross-sectional view in FIGS. 5a and 5b. On the raised side of the embossings 61 of the filter walls 65, a fluid filter element 60 of this type has adhesive threads 67 while between the corresponding depressions it has adhesive threads 68 of substantially greater height. Both the flatter adhesive threads 67 and also the higher adhesive threads 68 here extend with bridging regions 67a and 68a respectively over the respective outer fold edges 63a and 63b.

The object of the present invention comprises providing a fluid filter element of a structure which is substantially simplified in regard to the adhesive connections, in which the above-mentioned problems do not occur and which nonetheless can withstand high mechanical loadings and which satisfies high demands in terms of reliability and operating life.

SUMMARY OF THE INVENTION

The foregoing object is attained by a filter element comprising an embossed flat filter material which is folded so as to define a plurality of substantially adjacent walls, each wall having an embossing comprising a first embossing portion which extends from one side of said wall and a second embossing portion which is adjacent to said first embossing portion and which extends from the other side of said wall, and an adhesive connecting adjacent embossings of adjacent walls. The adhesive preferably has a substantially constant height.

The invention combines two essential concepts: 1. The concept of moving away from an application of adhesive to the filter medium, with such application of adhesive being controlled variably in respect of height; and 2. The concept of a positive-negative embossing of the filter medium which is combined in one and the same embossing region. The implementation of the first concept is possible by virtue of execution of the embossing in accordance with the second concept without cutbacks in regard to the functionality of the filter element. It is possible in that way to achieve substantial advantages over the previous filter element designs and production technologies as follows:

(1) a saving of adhesive in comparison with the previous filter element with "support threads";

(2) a symmetrical fold-adhesive-thread-geometry, with uniform clamping on both sides and support for the filter medium between adhesive threads;

(3) in comparison with the previous filter designs without "support threads", the invention makes it practically impossible for the filter medium to tear away from the adhesive or for the filter fleece or non-woven cloth to delaminate; and (4) a considerable degree of simplification in the installation of components, their installation and operation for adhesive application, including simplified control and maintenance, and so forth.

A particular advantage of the filter element of the present invention is that laterally mutually aligned adhesive threads are arranged both on the top side and also on the underside of each fold wall so that the filter material is clamped in each gluing region on both sides between adhesive threads. The forces which act on the filter material on the upstream flow side are thereby reliably withstood and supported and detachment of the filter fleece from the adhesive or delamination of the filter fleece is practically excluded.

Due to this heightened structural integrity, the distance between adhesive threads can be increased which in turn blinds off less filter material which in turn renders a filter with more available/working filter material, higher performance and longer life.

In a further preferred embodiment of the invention, the first and second portions of each embossing, which are mutually adjoining in the fluid flow direction, are at least approximately axially symmetric in relation to an axis of symmetry which extends in the center between the fold edges on the fold wall perpendicularly to the fluid flow direction. The shape of the first and second embossing portions is at least approximately triangular (in a section plane parallel to the fluid flow direction).

The apex of the configuration which is shaped out of the fold wall (in the first embossing region) and the bottom of the recess or part which is shaped into the fold wall (in the second embossing portion) are preferably disposed in one and the same plane and that plane is advantageously substantially parallel to the fluid flow direction and to other embossings. This makes it possible to adhesively join mutually adjacent fold walls using adhesive threads, spots or dots of precisely constant height, that is to say it permits the use of adhesive-applicator devices with a constant adhesive discharge amount per unit of time or per unit of length with a continuously traveling filter material.

In order to optimize the adhesive thread pattern on the finished filter element or fold pack, an additional adhesive spot or short adhesive thread can be added to the adhesive threads which moreover are produced with a constant adhesive discharge amount per unit of time or per unit of length of filter material, in the immediate area around the later outer fold edges. That permits adhesive threads to be caused to extend over the outer fold edges and thus provides a further increase in the stiffness and rigidity of the fluid filter element.

In a further embodiment, a short portion is cut out in the otherwise continuous adhesive threads in the immediate area around a later inner fold edge or a "fold bottom". That prevents the adhesive from being pressed wider at the inner edge when folding the filter material, and thus avoids the surface being unnecessarily greatly covered with adhesive.

If desired, for example to save adhesive, the application of adhesive may also be effected intermittently or in spot form over the entire length of the fold walls. In that way, the surface area which is covered with adhesive and which thus can no longer be used as a filter area is reduced, which has a positive influence on the filtration properties such as degree of separation, pressure difference, and dust holding capability of the filter. It will be appreciated, of course, that the mechanical stiffness and rigidity of the assembly is somewhat reduced as compared to a filter with continuous adhesive threads.

Besides the positive-negative main embossings which carry the adhesive threads or spots, further embossings which are not provided with adhesive can be provided in the otherwise flat region of the filter material. Those additional embossings can be shaped in a particularly simple fashion for example in the form of continuous grooving. Those additional embossings have the following effects:

(1) the free filter area is increased, that is to say a gain in the area of the filter medium is achieved, which results in a reduction in pressure difference or an increase in dust holding capability;

(2) the filter medium is additionally stabilized in the machine-running direction, which is helpful in particular in the operation of folding high folds;

(3) any instability in the filter medium at the fold center (that is to say in the region of the above-mentioned axis of symmetry or transition of the main embossings) is avoided, which also makes the folding operation easier; and (4) in the situation involving a high loading, total collapse (folding together) of adjacent fold walls in the region between the glued main embossings is avoided. The total amount of adhesive between two filter surfaces inside a fold, in a preferred embodiment, can comprise two portions or components which are applied to the respectively adjoining material surfaces and which are connected together when the filter element is folded together. In this manner, the partial threads or partial spots are applied having substantially the same volume so that the application of adhesive to the filter material, which passes through beneath the applicator devices in a continuous operation, with a constant adhesive discharge amount per unit of time, can be implemented continuously substantially over the length of the web. This is advantageous in that when adhesive is applied, it is applied at a constant volume or discharge rate from the adhesive nozzles to the filter paper, for example with simple "on"-"off" commands.

In an alternative embodiment, adhesive can be applied only to one of the two filter material portions or surfaces of a fold which are to be glued together, while the application of adhesive is interrupted when the second region or surface is passing through. In this case also it is possible to operate with a constant adhesive discharge amount. However, the adhesive can only penetrate into one of the two filter fleece surfaces before the filter is folded together.

The proposed structure can advantageously be used in relation to modern fluid filter materials which are produced on the basis of glass fiber or plastic fiber or which contain both types of fiber or any other type of fiber in combination with each other. The adhesive used is a hot melt or hot melt foam, which is known per se, or any other appropriate adhesive which can be applied in the form of an adhesive spot or thread which is relatively high but nonetheless stable.

BRIEF DESCRIPTION OF THE DRAWINGS

Preferred embodiments of the present invention are described in greater detail hereinafter with reference to the Figures of the drawings in which.

DETAILED DESCRIPTION

The invention relates to a filter element and method for forming same wherein embossed surfaces are provided on the filter material such that the embossed surfaces extend partially from each side of the filter material whereby, when folded, the embossed surfaces can be positioned substantially parallel and evenly spaced, thereby allowing substantially uniform application of adhesive and providing a resulting filter element having enhanced structural strength.

Figure 7:
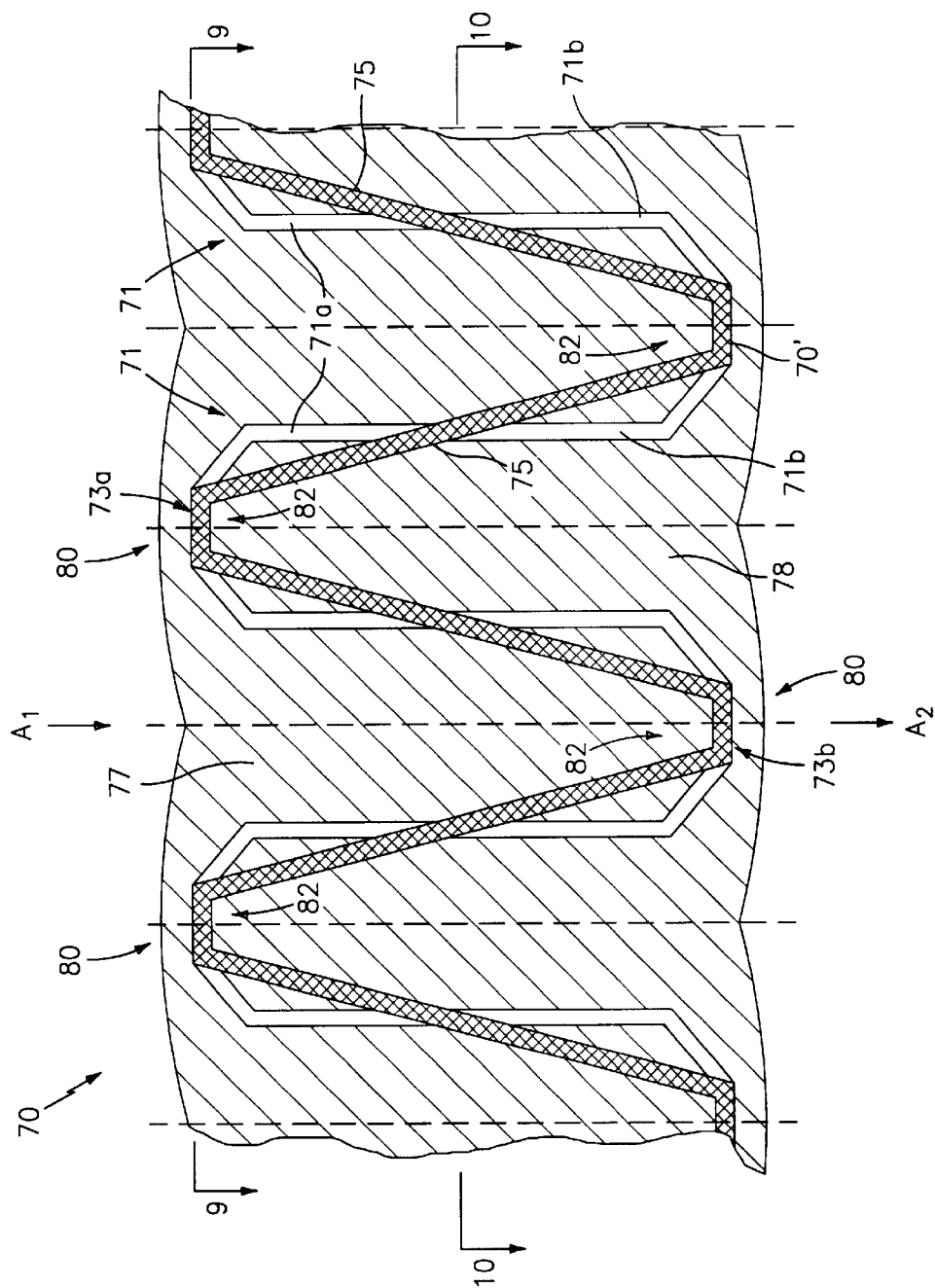
FIG. 7 is a view in section in a plane parallel to the fluid flow direction and perpendicularly to the plane of the filter material, illustrating an embodiment of a filter element according to the invention.

FIG. 7 illustrates a portion of a filter in accordance with the present invention. Filter 70 according to the invention is formed from a filter fleece or non-woven cloth material 70', typically made from glass fiber and plastic fiber components or the like. Embossings 71 are provided in material 70' which respectively include a first embossing portion 71a which projects out of the surface of the filter fleece material 70' in one direction and a second embossing portion 71b which adjoins the first embossing portion 71a and which is recessed into the plane of the filter fleece so as to extend from filter fleece material 70' in the opposite direction. The fold configuration shown here has fold edge regions 73a and 73b respectively which are flattened both in the upstream flow region and also in the downstream flow region. Fold edge regions 73a and 73b define walls 75 of material 70' therebetween, and embossing portions 71a and 71b advantageously extend between opposite fold edge regions of each wall 75. Embossing portions 71a and 71b are advantageously defined in a single plane, and the plane of embossing portions 71a and 71b is preferably oriented relative to the plane of walls 75 such that when material 70' is folded into the "V" pattern shown in FIG. 7, embossing portions 71a and 71b are substantially parallel to and equally spaced from embossing portions 71a and 71b of adjacent walls 75.

Pleat edges are embossed so they are flat and perpendicular to the air flow so as to define fold edge regions 73a and 73b, and can be produced by impressing second fold edges which are disposed in closely juxtaposed relationship, into the filter medium in a lying or flat condition.

Hot melt adhesive threads are applied on both sides in the region of the embossings 71 as will be further discussed hereinafter. When folded to the position shown in FIG. 7, the hot melt adhesive threads join together to form interconnected adhesive support portions 77, 78. The mutually adjacent fold walls 75, after the adhesive has set, are respectively clamped firmly in position on both sides, by virtue of those adhesive support portions, which is a substantial improvement over prior art configurations.

Figure 8:
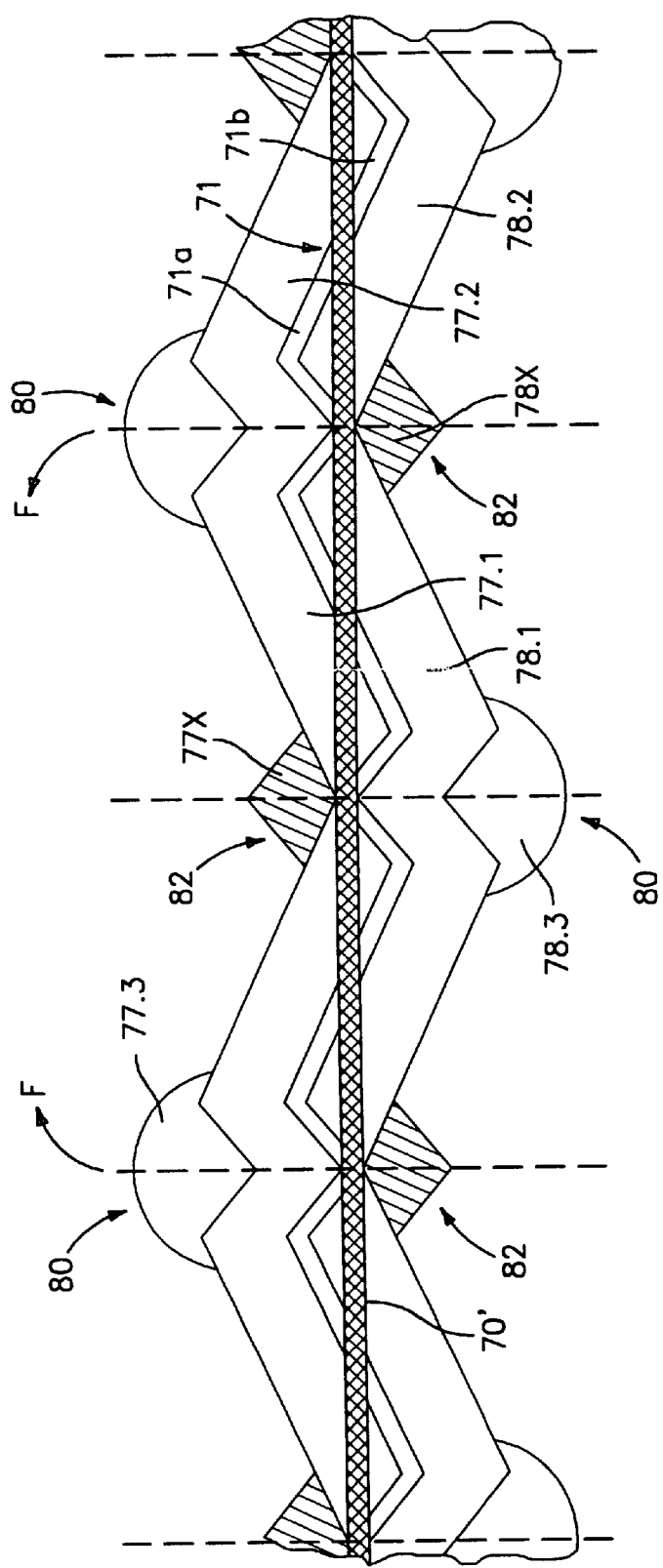
FIG. 8 is a diagrammatic view of a filter according to the invention in section, and not to scale, provided with an application of adhesive, prior to folding to produce a fluid filter element of the kind shown in FIG. 7.

FIG. 8 shows a structure according to the invention with filter material 70' in the lying or flat condition, after the embossing operation and application of adhesive but before folding. The adhesive threads on the embossings 71, which form the adhesive support portions 77 and 78 of (FIG. 7) when the material is folded together, are identified in FIG. 8 by references 77.1 and 77.2, 78.1 and 78.2 respectively. When folded into final form, material 70' is folded as shown by arrows F so as to define outer fold edges 80 and inner fold edges 82 (also shown in FIG. 7). Additional adhesive spots 77.3 and 78.3, respectively, can be applied to those adhesive threads at outer fold edges 80. This additional adhesive, in the operation of folding the material together, forms an adhesive region which extends over the flattened outer fold edges 80, as shown in FIG. 7 so as to strengthen the resulting structure.

References 77x, 78x of FIG. 8 symbolically illustrate "points" of excess adhesive which would be produced with uninterrupted application of a continuous adhesive thread to the embossed filter material. Such "points" can spread when the material is folded. However, this can be prevented by the application of adhesive being interrupted at the inner fold edges 82. The regions 77x, 78x of adhesive are therefore not present on a fiber fleece which is provided with interrupted adhesive threads, advantageously preventing spread of such adhesive upon folding which can reduce useful filter area of the material.

Figure 9:
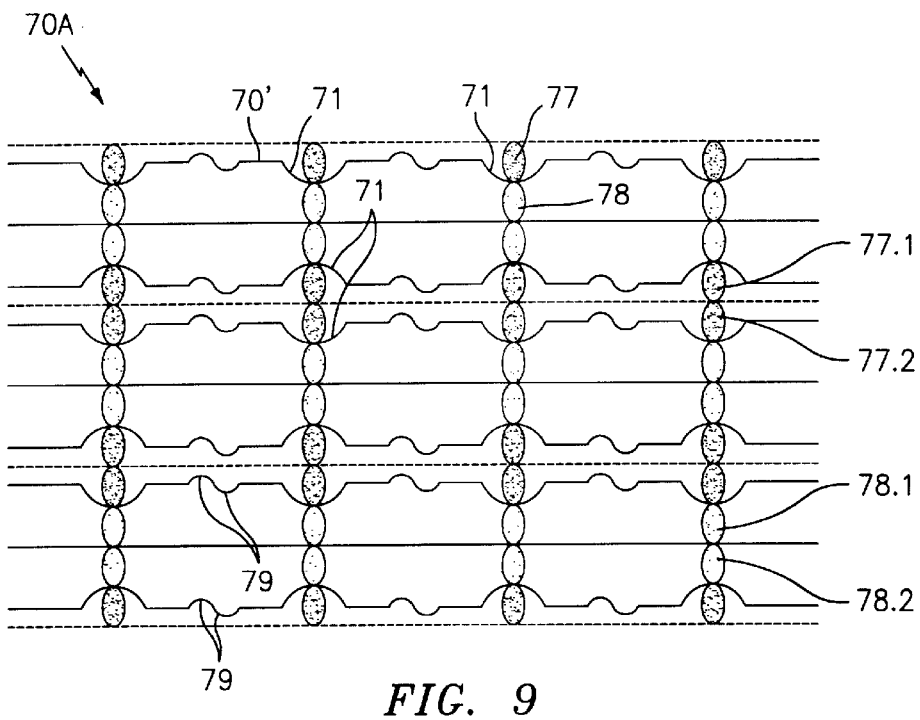
FIGS. 9 through 11 are diagrammatic views of a filter according to the invention in section in various planes perpendicularly to the fluid flow direction.
Figure 10:
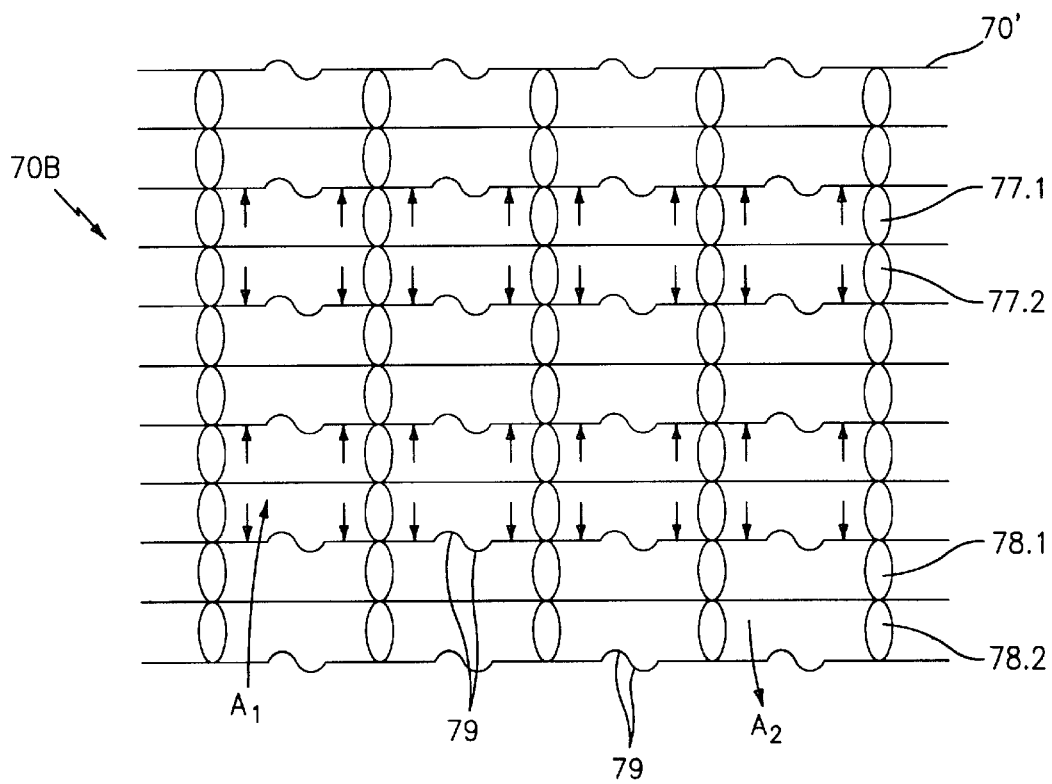

FIGS. 9 and 10 show different filter structures, 70A and 70B respectively of the filter structure of the kind shown in longitudinal section in FIG. 7 as cross-sections perpendicularly to the fluid flow direction at different section planes. FIG. 9 shows a section at the height of the embossing maxima of embossings 71 along the lines 9—9 of FIG. 7, while FIG. 10 is a view in the plane containing the axis of symmetry or transition of the two embossing portions along the lines 10—10 of FIG. 7, where therefore the embossings 71 as such do not protrude and consequently cannot be seen.

Figure 11:
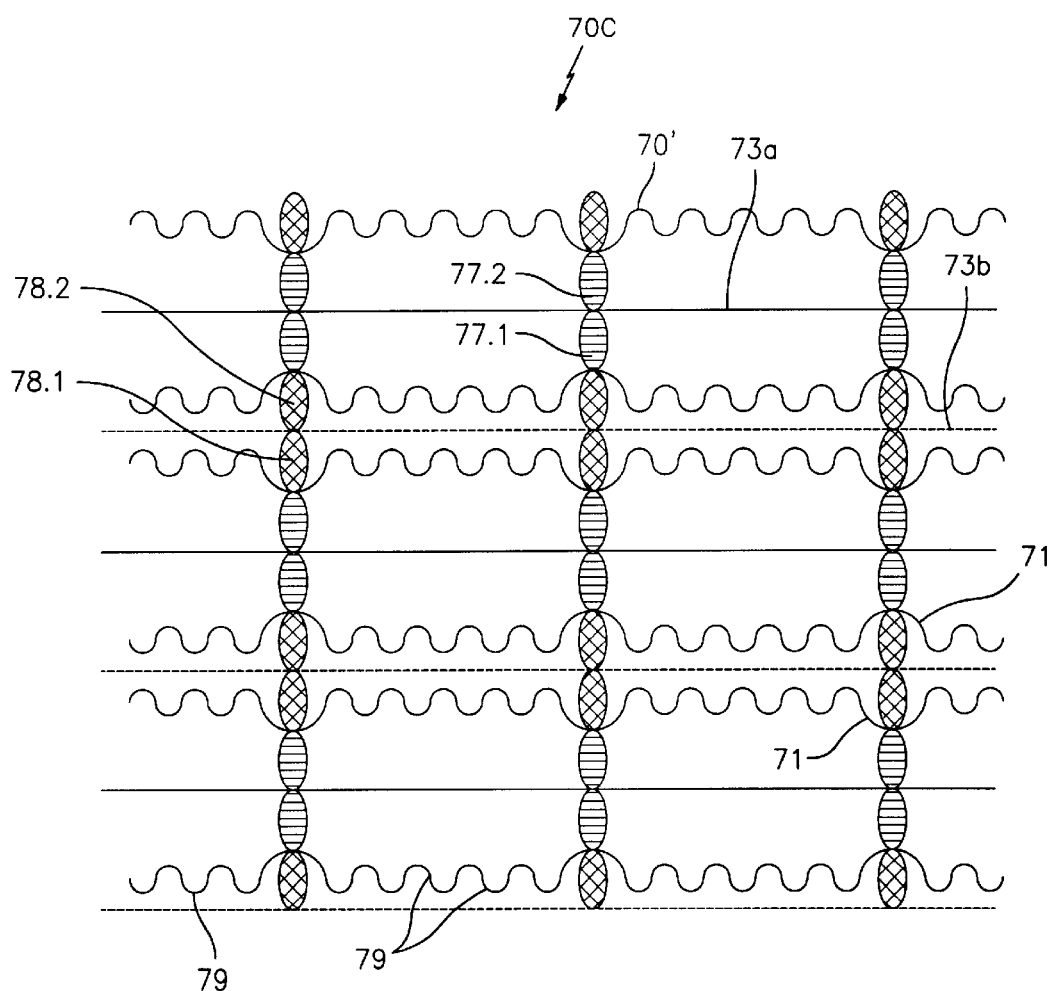

FIGS. 9 and 10 also show additional embossed longitudinal grooves 79 in the filter medium 70' which, as discussed above, are advantageous in terms of optimum mechanical stability of the filter medium, in particular in terms of executing the initial folding procedure without any problems, and also in providing additional filter surface area. In the embodiment shown in FIG. 11, a filter 70C is shown wherein the number of additional embossings is greater than in FIGS. 9 and 10 and the distribution between the gluing regions is uniform.

Figure 1:
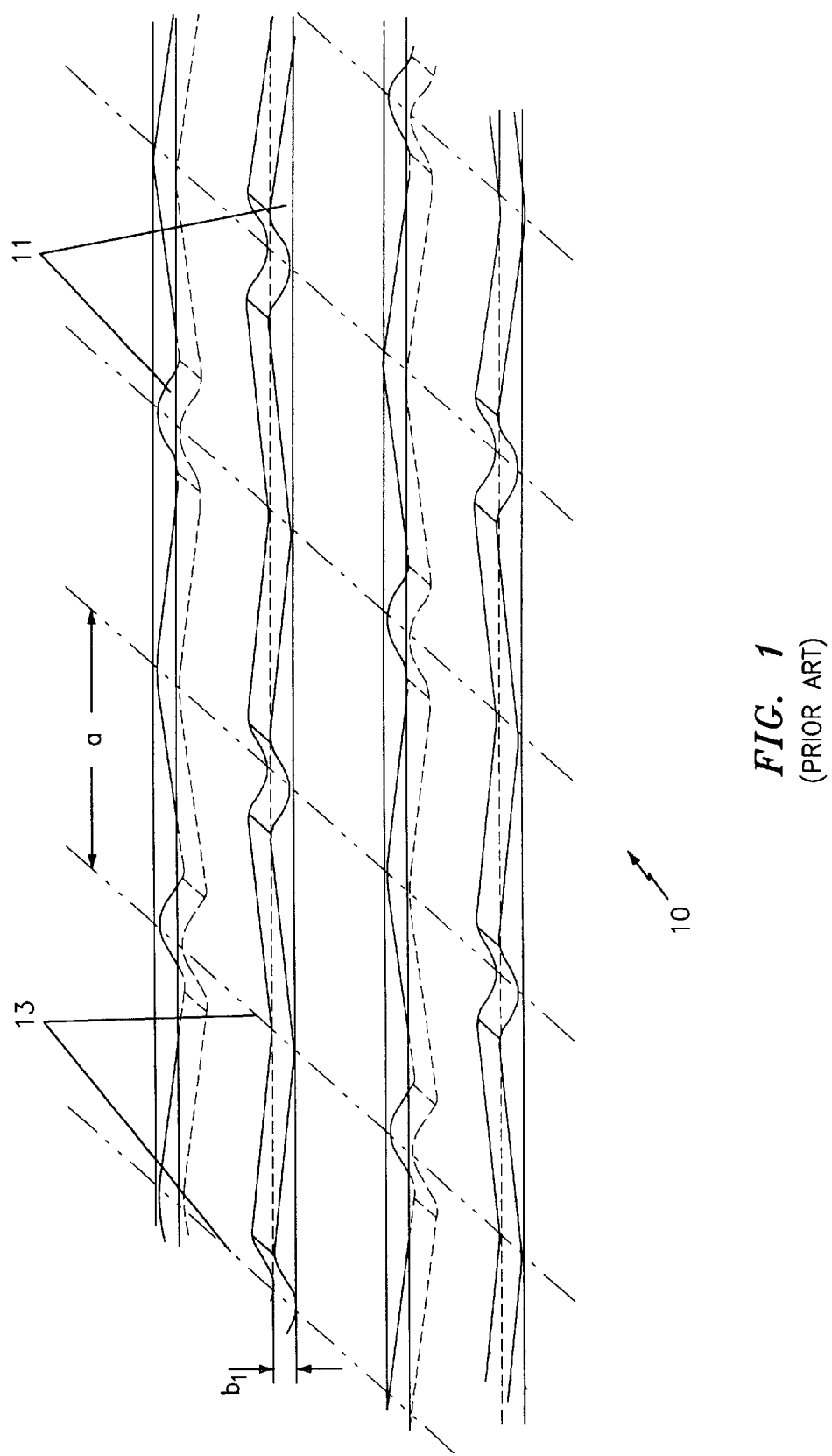
FIG. 1 is an isometric view of a prior art filter medium.
Figure 2:
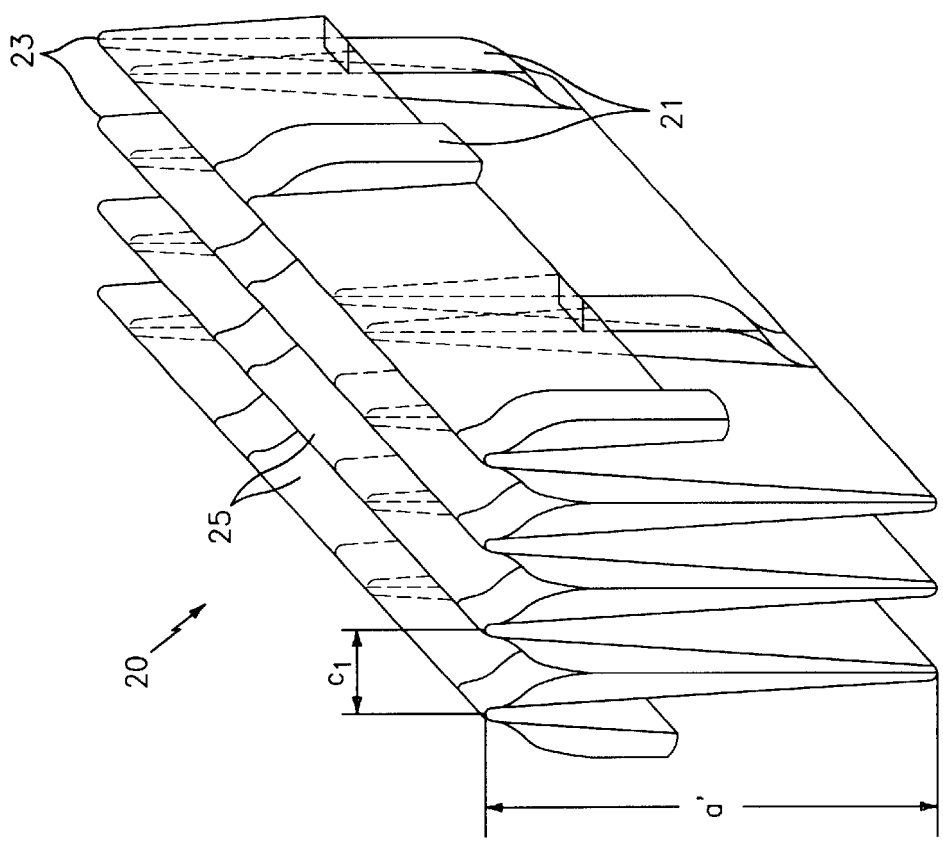
FIG. 2 is an isometric view of a part of a prior art fluid filter element which is produced by folding an embossed filter medium of the kind shown in FIG. 1.
Figure 3:
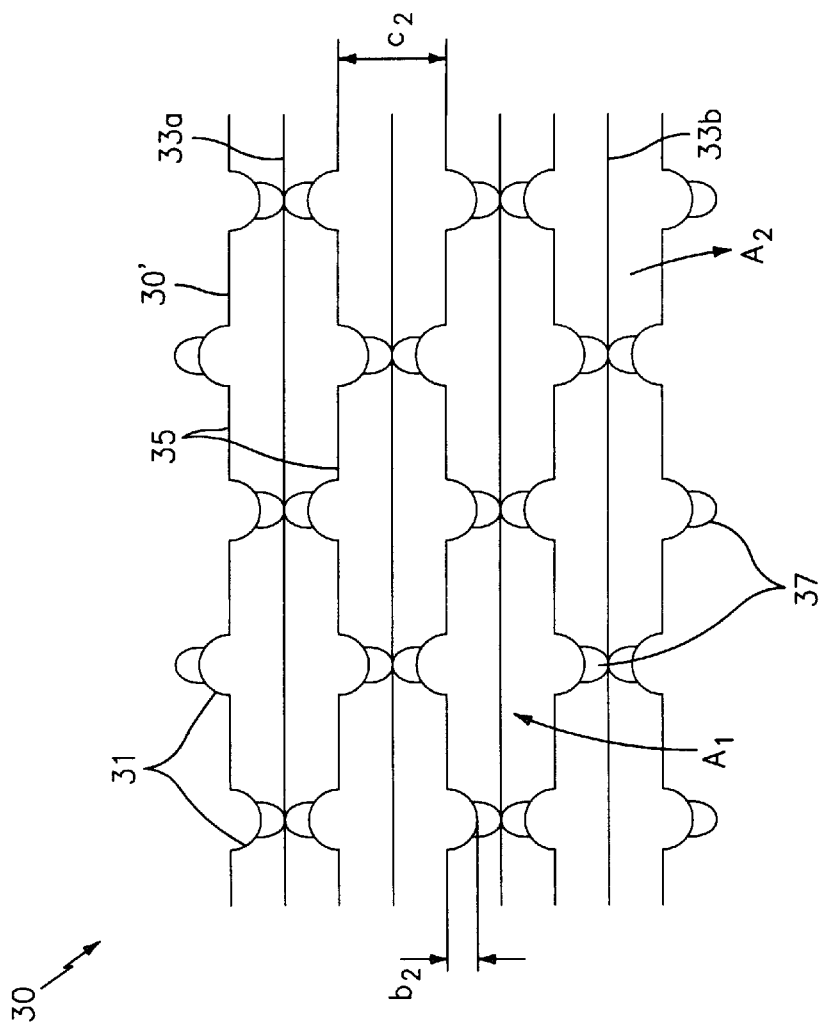
FIG. 3 is a cross sectional view of a prior art fluid filter element in which the fold walls are connected together by way of thick adhesive threads on the embossings, in a sectional plane perpendicular to the fluid flow direction.
Figure 4A:
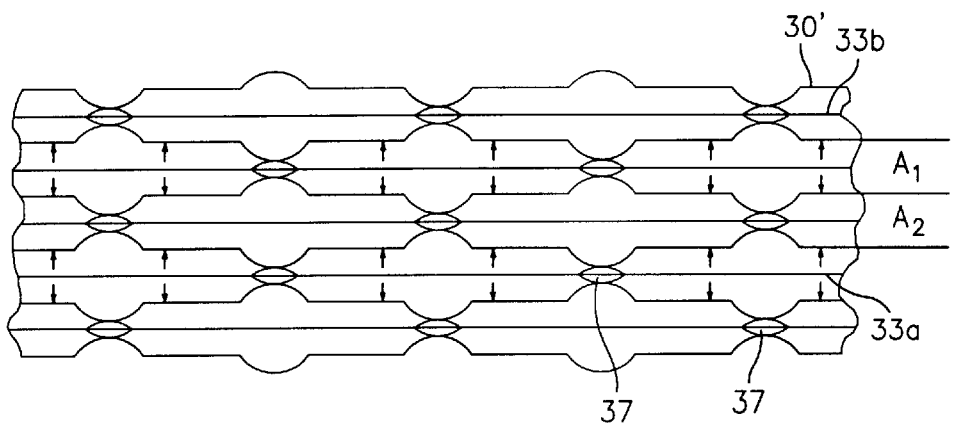
FIGS. 4a through 4c are diagrammatic views to show the loading characteristics of a prior art fluid filter element of the kind illustrated in FIG. 3.
Figure 4B:
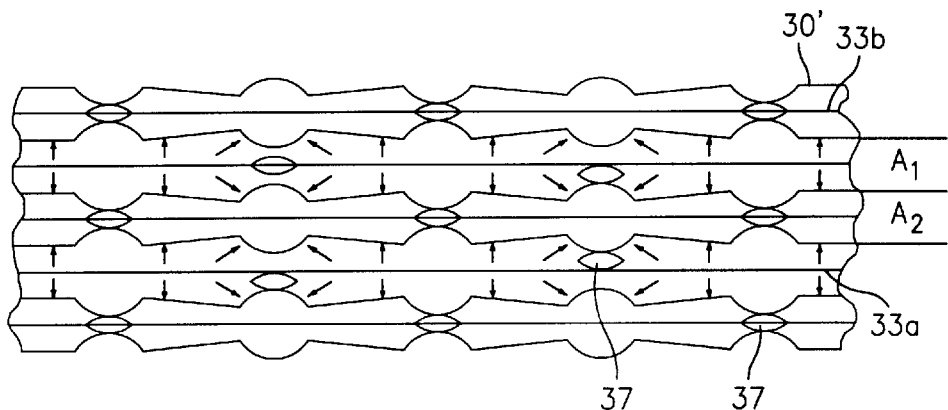
Figure 4C:
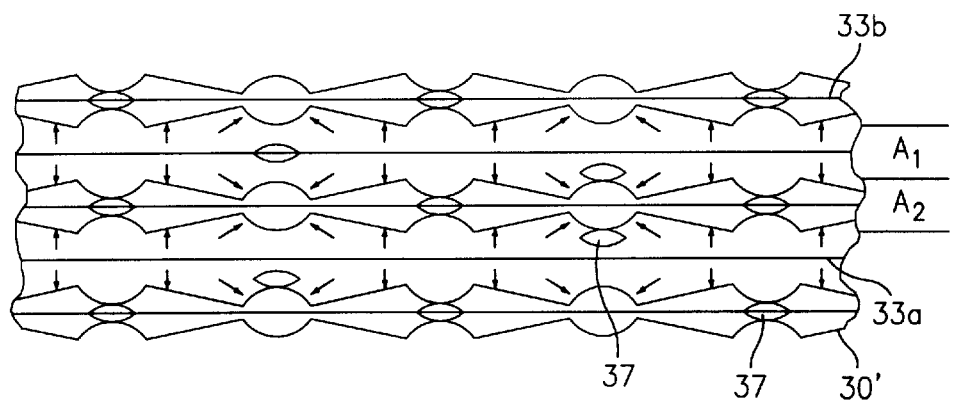
Figure 5A:
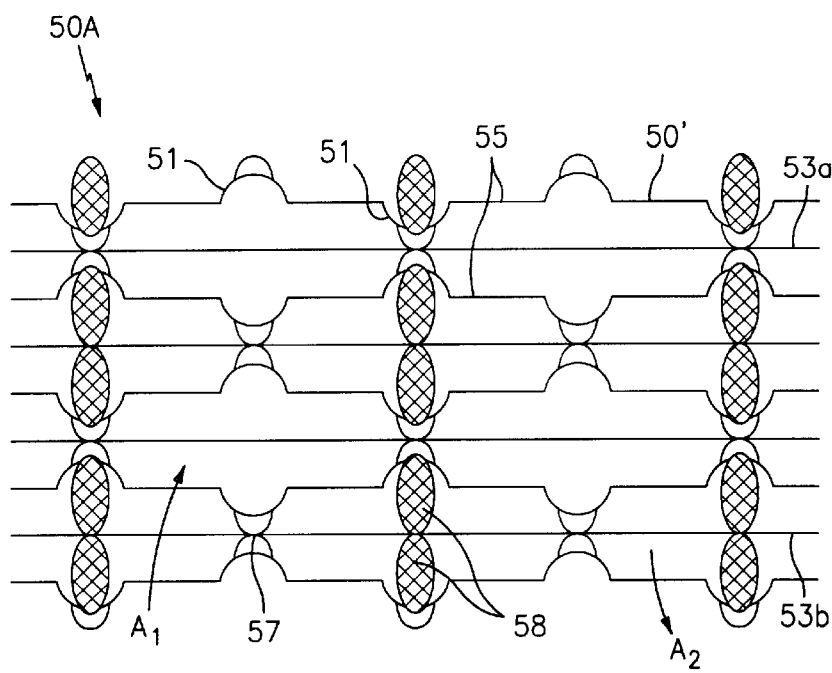
FIGS. 5a and 5b are diagrammatic views in section in a plane perpendicular to the fluid flow direction, of a prior art fluid filter element with additional "support threads", in two different embodiments.
Figure 5B:
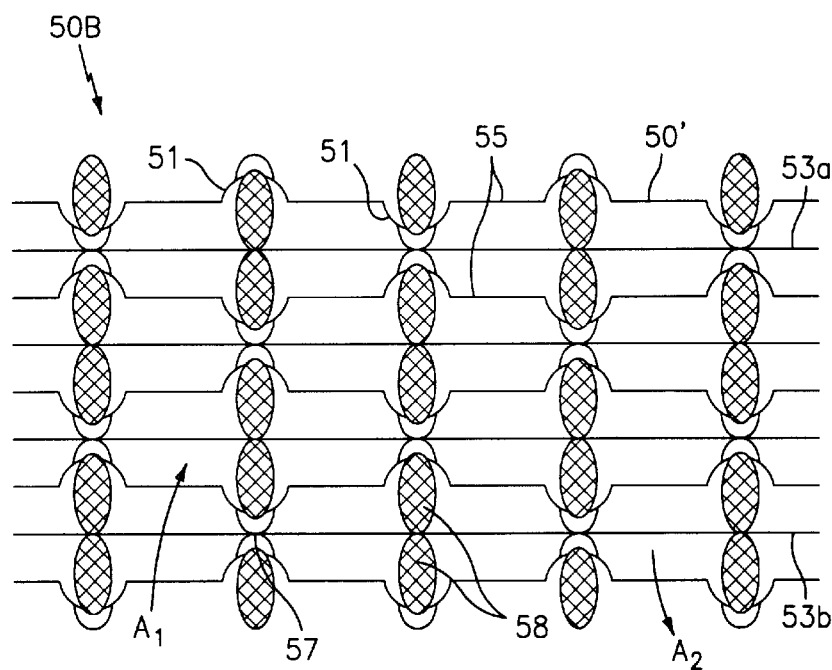
Figure 6:
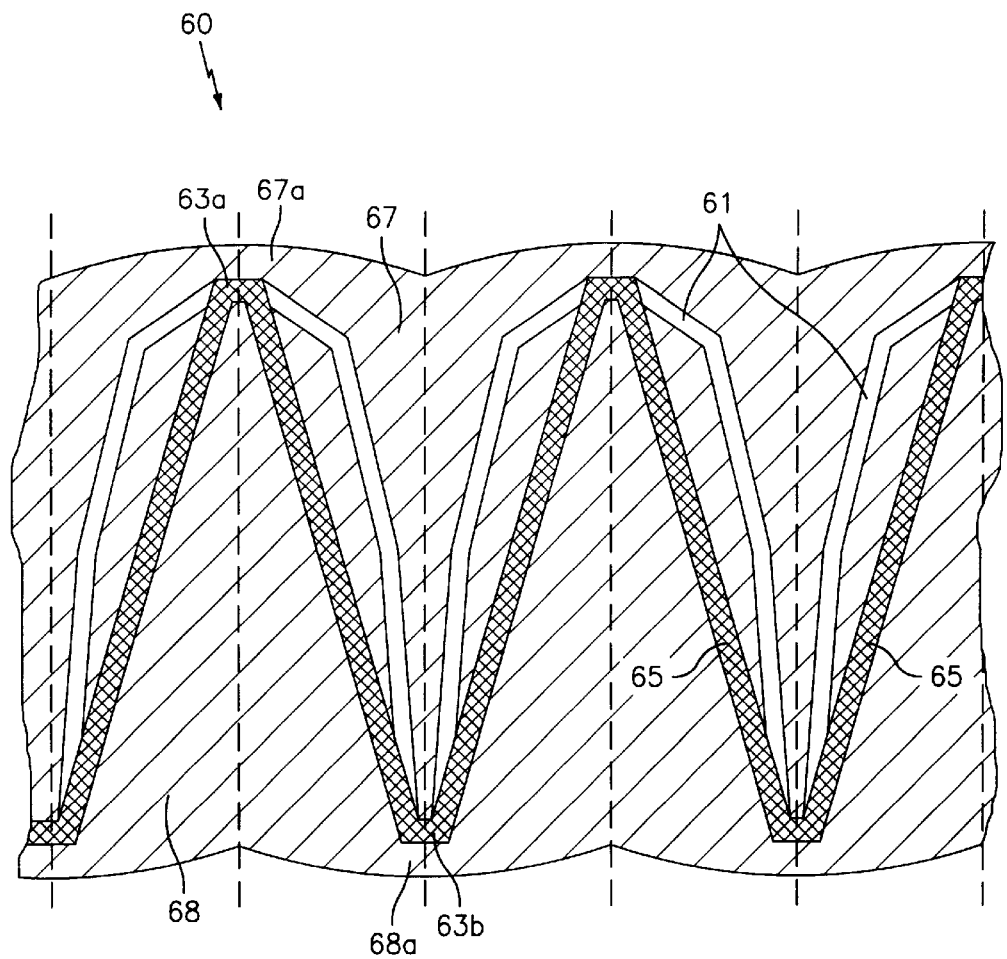
FIG. 6 is a view in section in a plane parallel to the fluid flow direction and perpendicularly to the plane of the filter material, showing a prior art fluid filter element of the kind illustrated in FIGS. 5a and 5b.
Figure 12A:
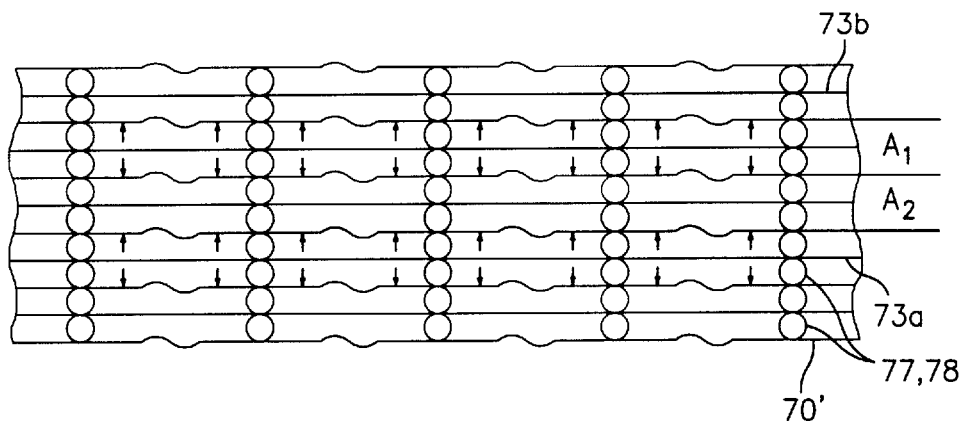
FIGS. 12a through 12c are diagrammatic views in section to illustrate the loading characteristic of a fluid filter element according to the invention.
Figure 12B:
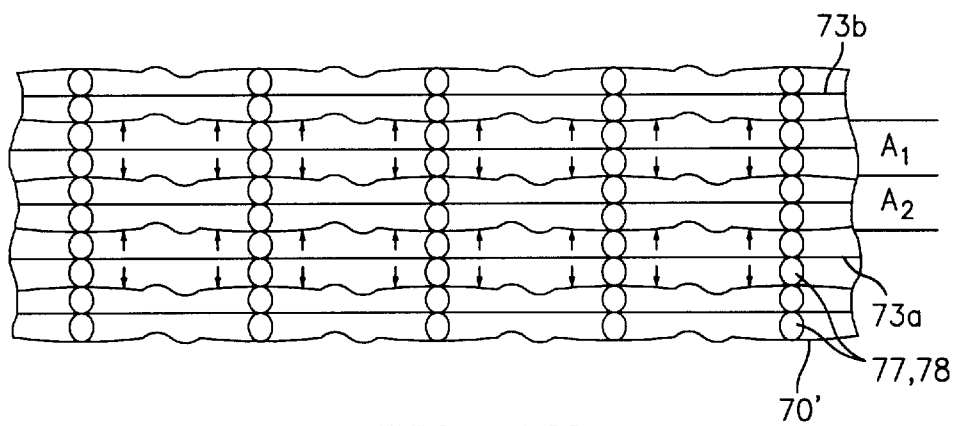
Figure 12C:
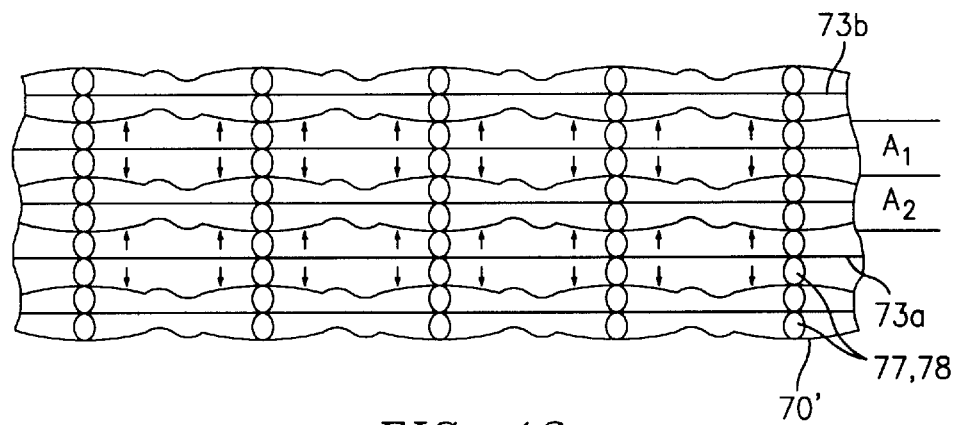

FIGS. 12a through 12c illustrate the loading characteristic of a filter structure according to the invention. FIG. 12a shows a filter in an unloaded "virgin" condition. FIG. 12b shows a condition involving a low loading in which very slight bending or flexing of the filter medium occurs between the gluing regions. FIG. 12c shows the case of a high ongoing loading where the filter medium flexes to a relatively moderate degree. This clearly shows an advantage of the present invention wherein the media is not deformed to the high degrees that occur with the prior art technology between the gluing regions. (Compare FIGS. 4a–4c). Since the filter medium is clamped in position on both sides by and between adhesive support portions, detachment of the filter medium from the adhesive threads and delamination of the filter fleece are reliably prevented. No deformation of the filter medium and in particular no collapse of individual folds occurs, outside the slight (non-critical) flexural phenomena. The functional capability of the filter is reliably guaranteed even in the event of high and/or long ongoing loadings.

Figure 13:
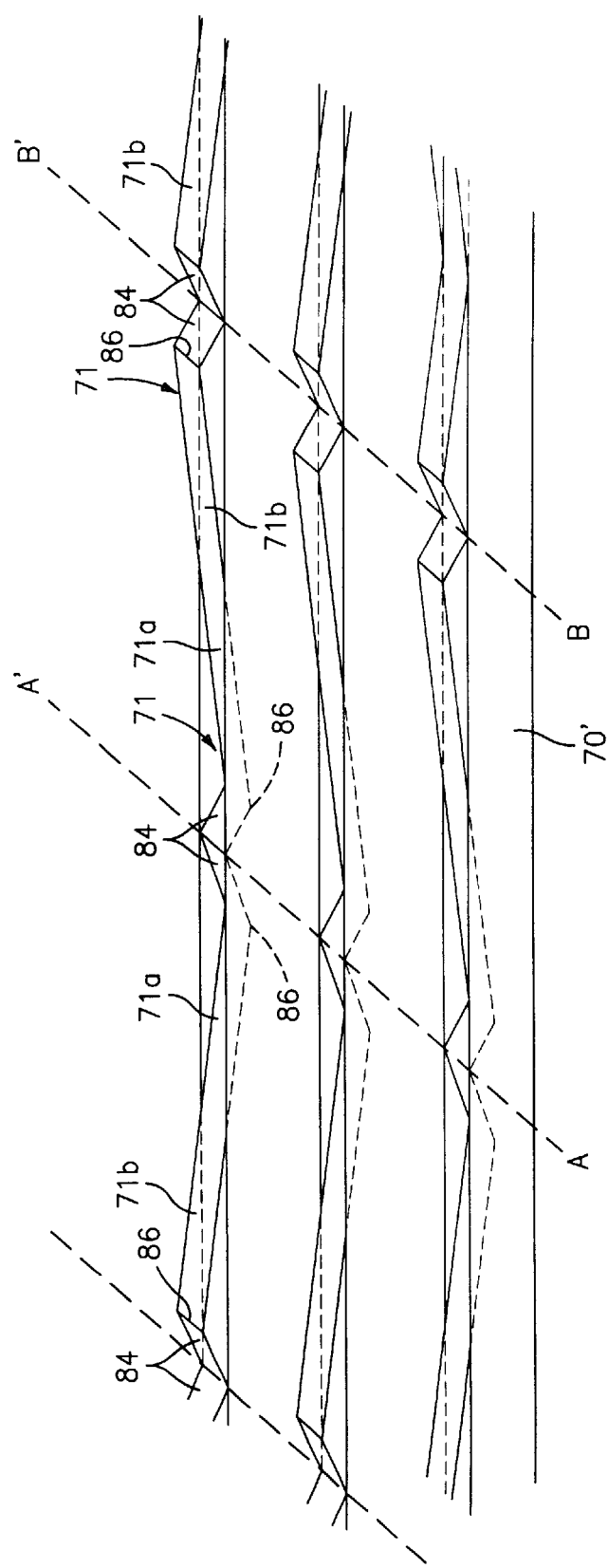
FIG. 13 illustrates a filter material prior to folding and embossed in accordance with the present invention.

FIG. 13 further illustrates the structure of embossings formed in filter material 70' prior to folding in accordance with the present invention. FIG. 13 shows flat material 70' provided with a series of parallel embossings 71 wherein each embossing 71 is substantially planar and has a first embossing portion 71a extending from one side of material 70' and a second embossing portion 71b extending from the other side of material 70'. These embossings can advantageously be formed in material 70' using embossing rollers or any other apparatus suitable for forming contoured structure in material 70' as desired. Still referring to FIG. 13, embossings 71 further include end embossing portions 84 which extend from the apex 86 of first and second embossings 71a, 71b, back toward the plane of material 70'.

FIG. 13 also shows the preferred orientation of embossings 71 in accordance with the present invention, wherein adjacent embossings 71 have respective first or second embossing portions 71a, 71b substantially adjacent to or oriented toward each other. Fold lines for material 70' are shown at axes A–A' and B–B', and the preferred orientation of embossings 71 provides that when folded, first embossing portions 71a will face each other, and second embossing portions 71b will also face each other. This advantageously allows for the folding of material such that material 70' where it is not embossed is configured in a substantially zig-zag or V-shaped position, while embossings 71 are positioned substantially parallel to each other so as to facilitate application of adhesive to embossings 71 at a constant flow-rate of adhesive, which provides for a constant height or amount of adhesive per length as desired in accordance with the present invention.

Following embossing as shown in FIG. 13, adhesive is applied to embossings 71, preferably on both sides of material 70' at embossings 71, and in either or both of continuous threads or interrupted spots or portions, and material 70' is then folded along the fold axes as described above.

The resulting structure is as shown in FIG. 7.

FIGS. 14–22 illustrate further embodiments of the invention and contain like reference numerals for like elements as described above.

Figure 14:
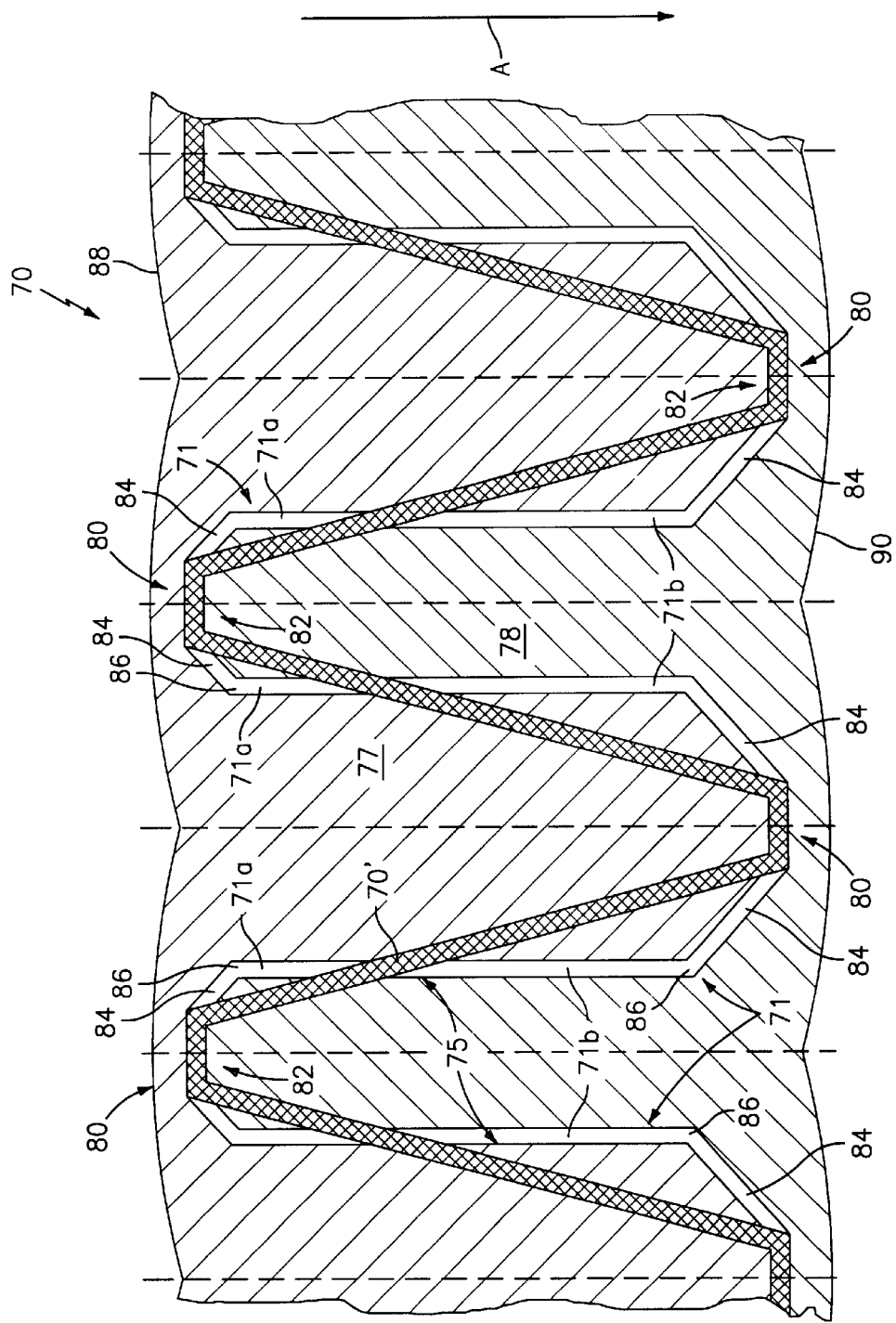
FIGS. 14–22 illustrate different embodiments of filter elements in accordance with the present invention.

Turning to FIG. 14, an alternative embodiment of the present invention is illustrated wherein embossings 71 are not formed symmetrically as shown in FIGS. 7 and 13, but instead are asymmetric such that first and second embossing portions 71a, 71b are not the same size. When material 70' is provided with asymmetric embossings in an alternating relationship as discussed in connection with FIG. 13, a subsequent folding of material 70' into the desired filter structure results in a similar structure to FIG. 7, wherein material 70' remains in a substantially V-shaped or zig-zag pattern, and embossings 71 remain substantially parallel to each other. However, spacing between embossings 71 is alternately larger and smaller, with substantially uniform spacing on the larger and smaller spaced portions. In this manner, a filter element 70 as shown in FIG. 14 can be provided wherein openings between embossings 71 of walls 75 facing the upstream or in-flow direction (see flow direction arrow A), has a wider spacing, and spacing between embossing 71 of walls 75 opening in the downstream or out-flow direction is narrower. The pleat spacing between fold walls 75 remains the same, on upstream and downstream side of the filter element. With this structure, a thicker stream 88 of adhesive is applied to embossings 71 on the upstream side, and a thinner stream 90 of adhesive is provided on the downstream side, while each stream is still nevertheless provided having a substantially constant thickness or height.

Figure 15:
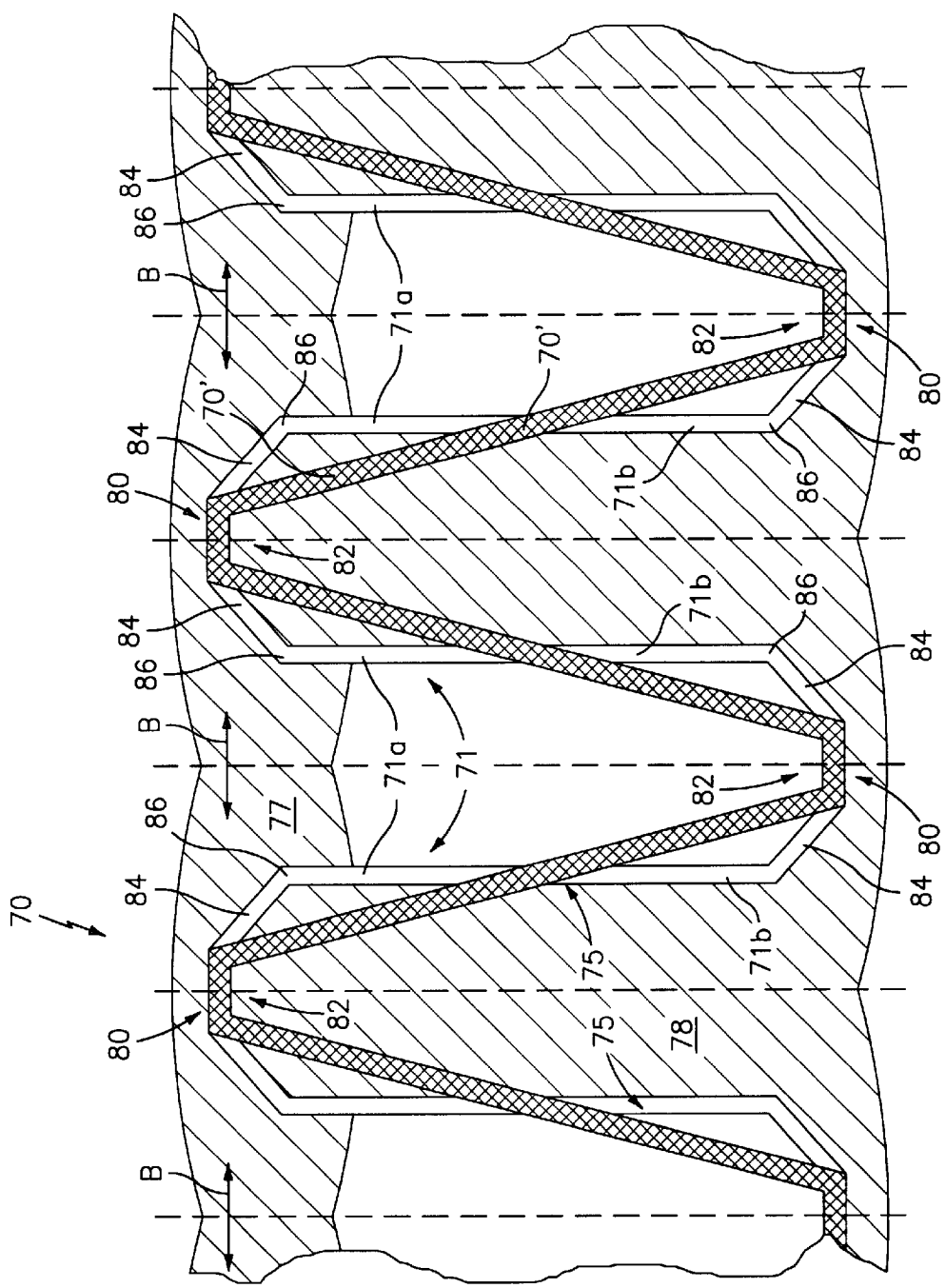

As set forth above, it may also be desirable to apply adhesive to one or both sides in interrupted or discontinuous spots or portions, rather than in continuous portions. Turning to FIG. 15, an embodiment showing such as structure is presented. FIG. 15 shows material 70' with embossings 71, and with adhesive applied to the downstream side of material 71 in a substantially continuous manner. However, on the upstream side of material 70', adhesive is provided on embossings 71 only in the area of outer fold edges 80, such that when material 70' is folded as desired, adhesive is present on the upstream side only along outer fold edges 80. In further connection with this embodiment, adhesive to be positioned at outer fold edges 80 may be provided as a stretchable or compressible adhesive, which retains stretchability or compressability at curing, such that material 70' can be formed into a filter that has a round structure. When forming such a filter, the material would be first folded to allow the adhesive to bond, and would then be formed into the round structure resulting in outward or inward movement of outer fold edges 80 as shown by arrows B, so as to provide a round pleated filter pack as desired.

Figure 16:
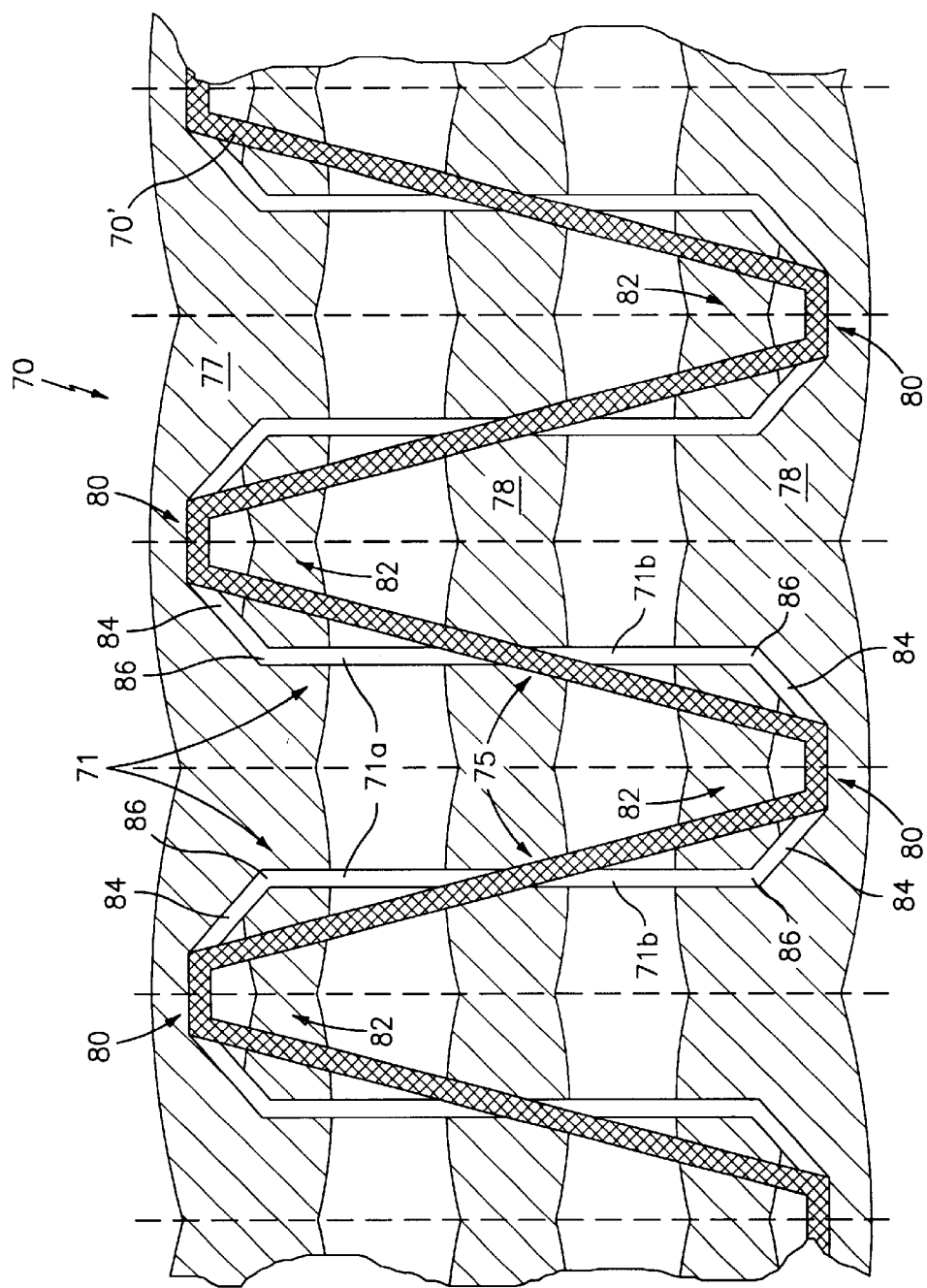

FIG. 16 shows a further alternative embodiment of the present invention wherein adhesive is applied to both upstream and downstream sides of embossings 71 in discontinuous or "spot" configurations. These spots are positioned in this embodiment such that they are in corresponding positions on upstream and downstream sides except at the folds, where adhesive is maintained continuous along outer fold edges 80 and is interrupted along inner fold edges 82. This is advantageous in that a saving in adhesive is accomplished, adhesive spreading at inner fold edges 82 is avoided, and more filter material is exposed, with less being masked or screened by adhesive, for use as intended to filter fluid passing therethrough.

Figure 17:
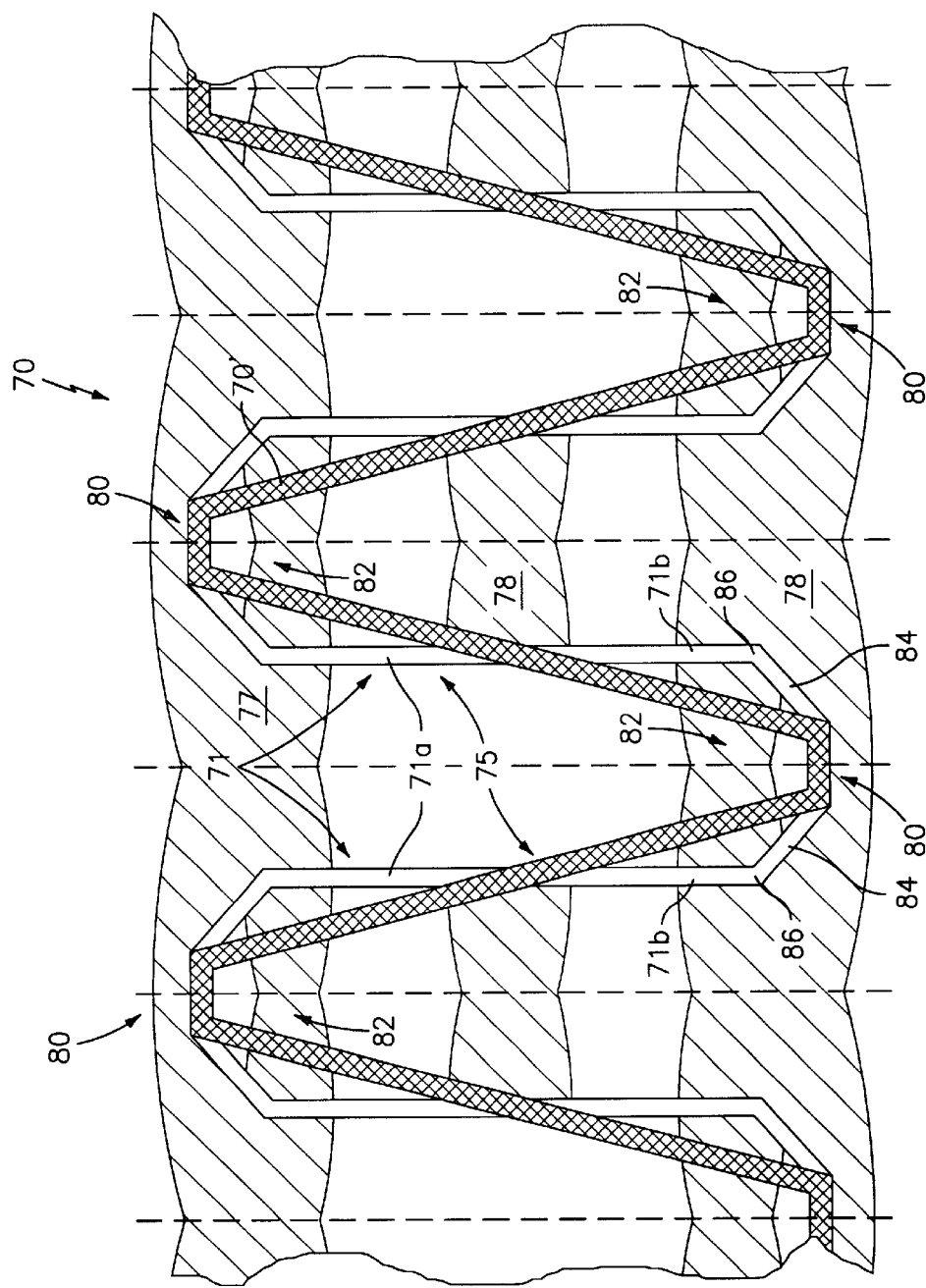

FIG. 17 shows a further embodiment wherein adhesive is applied on both sides in discontinuous fashion. In this embodiment, adhesive is positioned on the upstream side in a continuous manner along outer fold edges 80 and in a discontinuous manner along inner fold edges 82, with no adhesive positioned therebetween, and adhesive is also positioned on the downstream side in discontinuous fashion similar to that shown in FIG. 16. This embodiment results in further exposure of additional material for filtering, and further savings in terms of the quantity of adhesive used. Of course, as less adhesive is used, the resulting filter structure loses some structural strength.

Figure 18:
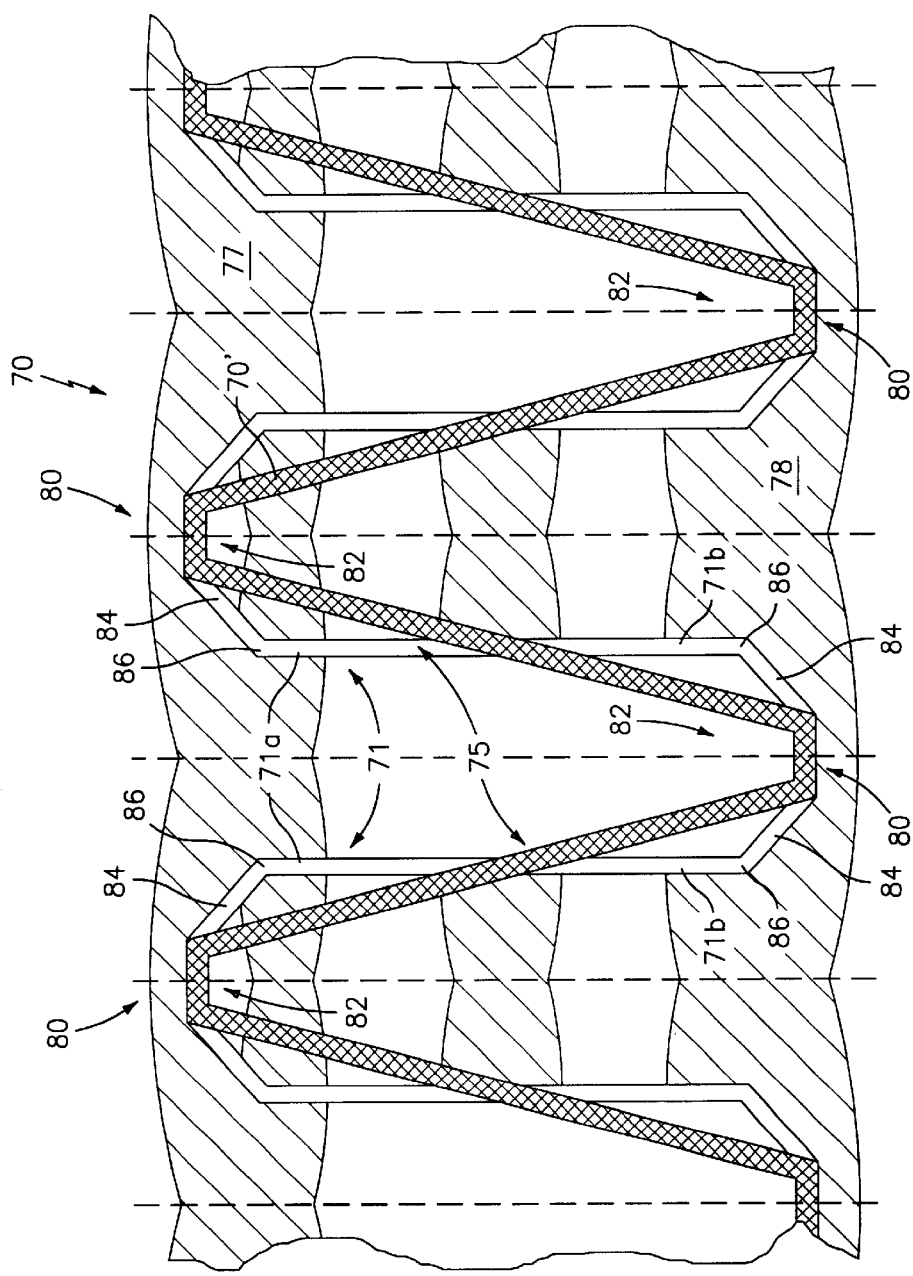

FIG. 18 shows still another embodiment wherein less adhesive is used, and in this embodiment adhesive is positioned on the upstream side of embossings 71 only at outer fold edges 80, and is positioned on the downstream side in similar fashion to that shown in FIGS. 16 and 17. This structure results in yet further savings in material and exposure of filter material for its intended purpose, as a trade off toward some structural strength.

Figure 19:
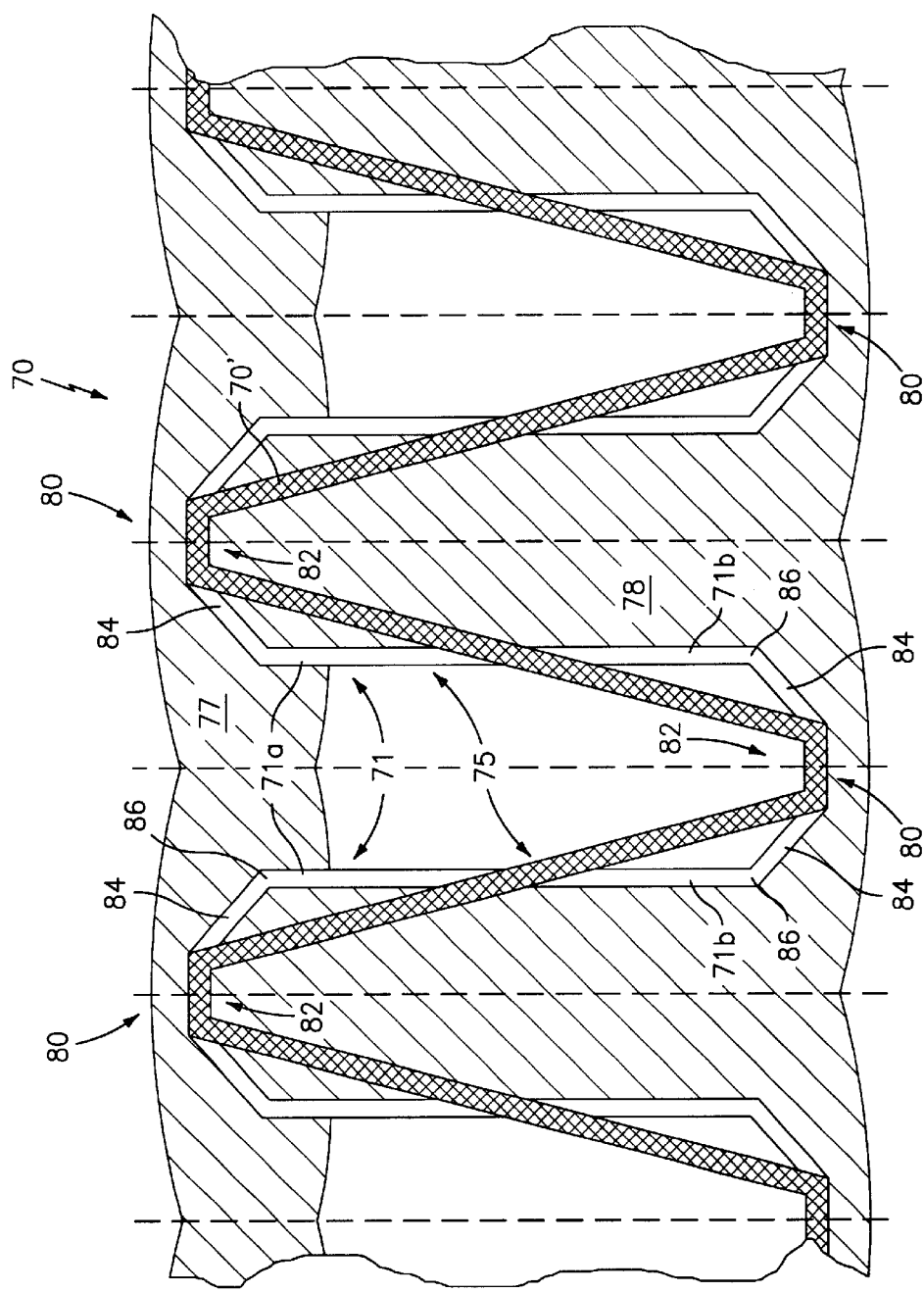

Turning now to FIG. 19, still another embodiment is illustrated wherein adhesive is positioned at the upstream side of embossings 71 only at outer fold edges 80, and is positioned on the downstream side in a substantially continuous stream or thread.

Figure 20:
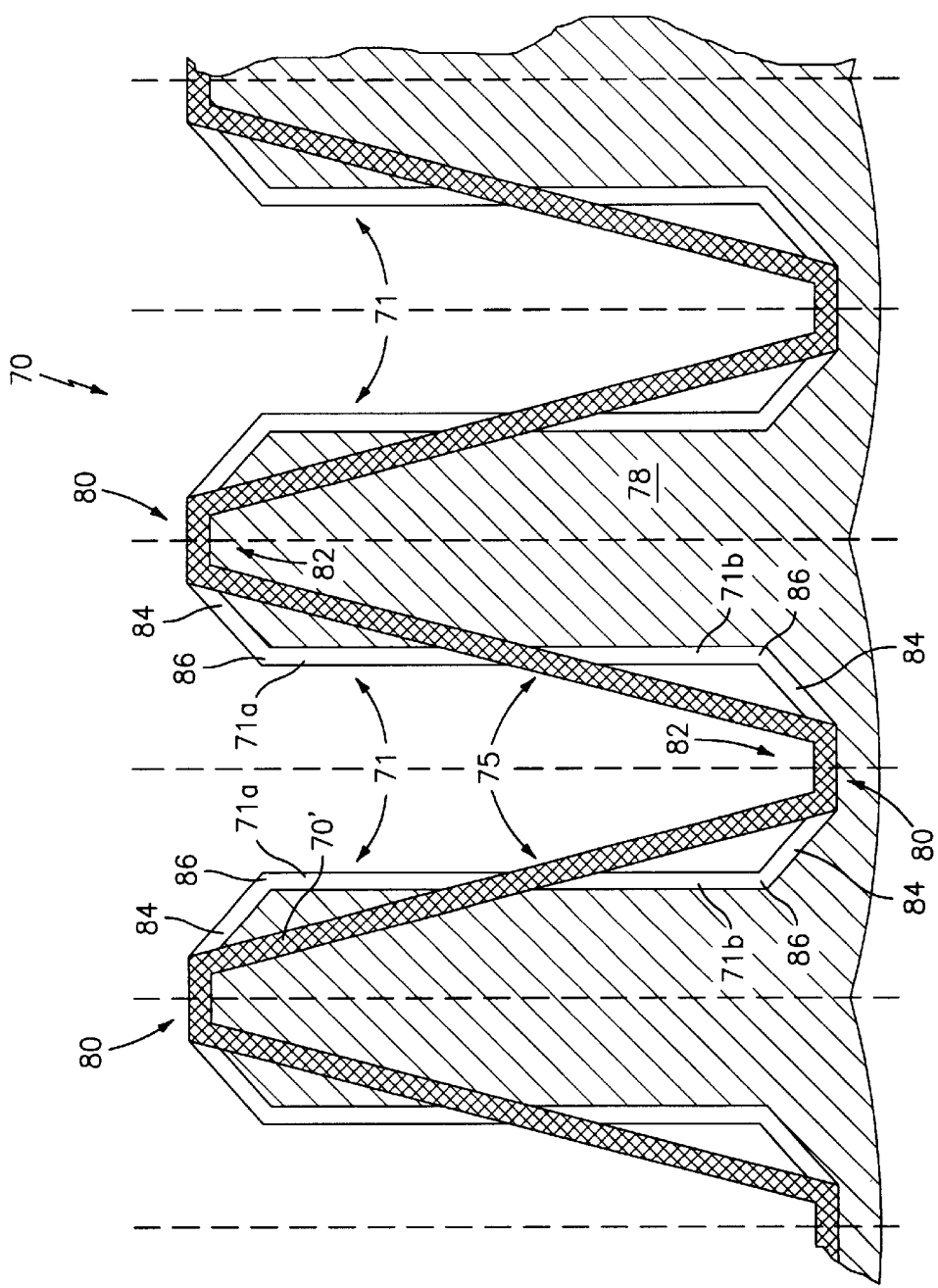

Turning now to FIG. 20, a further embodiment of a filter 70 in accordance with the present invention is shown wherein adhesive is applied only to embossings 71 on wall surfaces opening on the downstream side of the filter. Such a configuration still provides benefits in accordance with the broad scope of the present invention and can be desirable in some applications. For example, this allows for a flexible filter element that can be formed into a round or other shaped filter pack as dictated by the end use.

Figure 21:
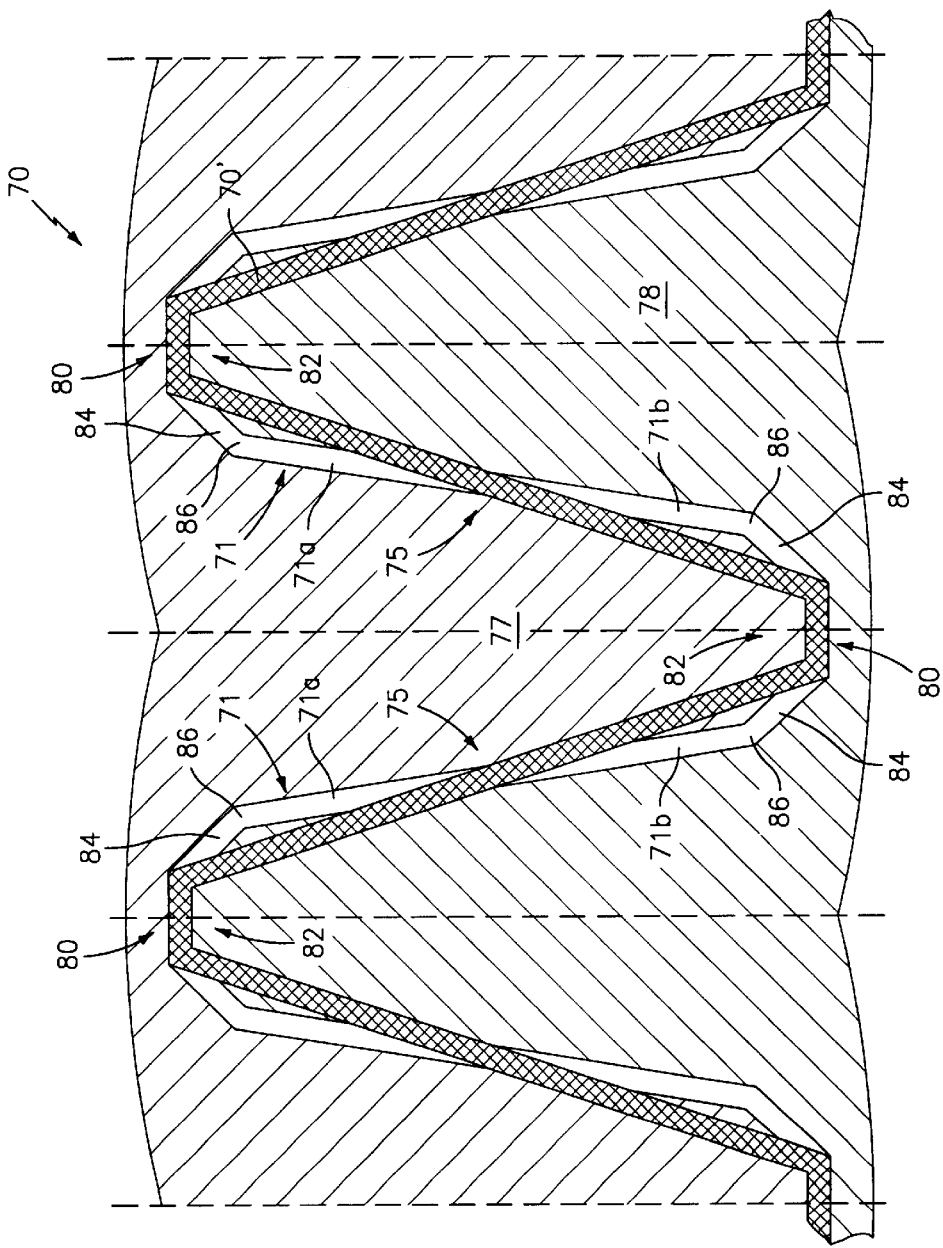

Turning to FIG. 21, a filter 70 is illustrated wherein embossings 71 are "under-embossed, or material 70' is not folded as densely as in the embodiment of FIG. 7, such that embossings 71 are not substantially parallel. In such an embodiment, the adhesive threads would need to be applied in varying thickness or height. However, such a structure is within the broad scope of the present invention and does still provide benefits in terms of structural strength and reliability.

Figure 22:
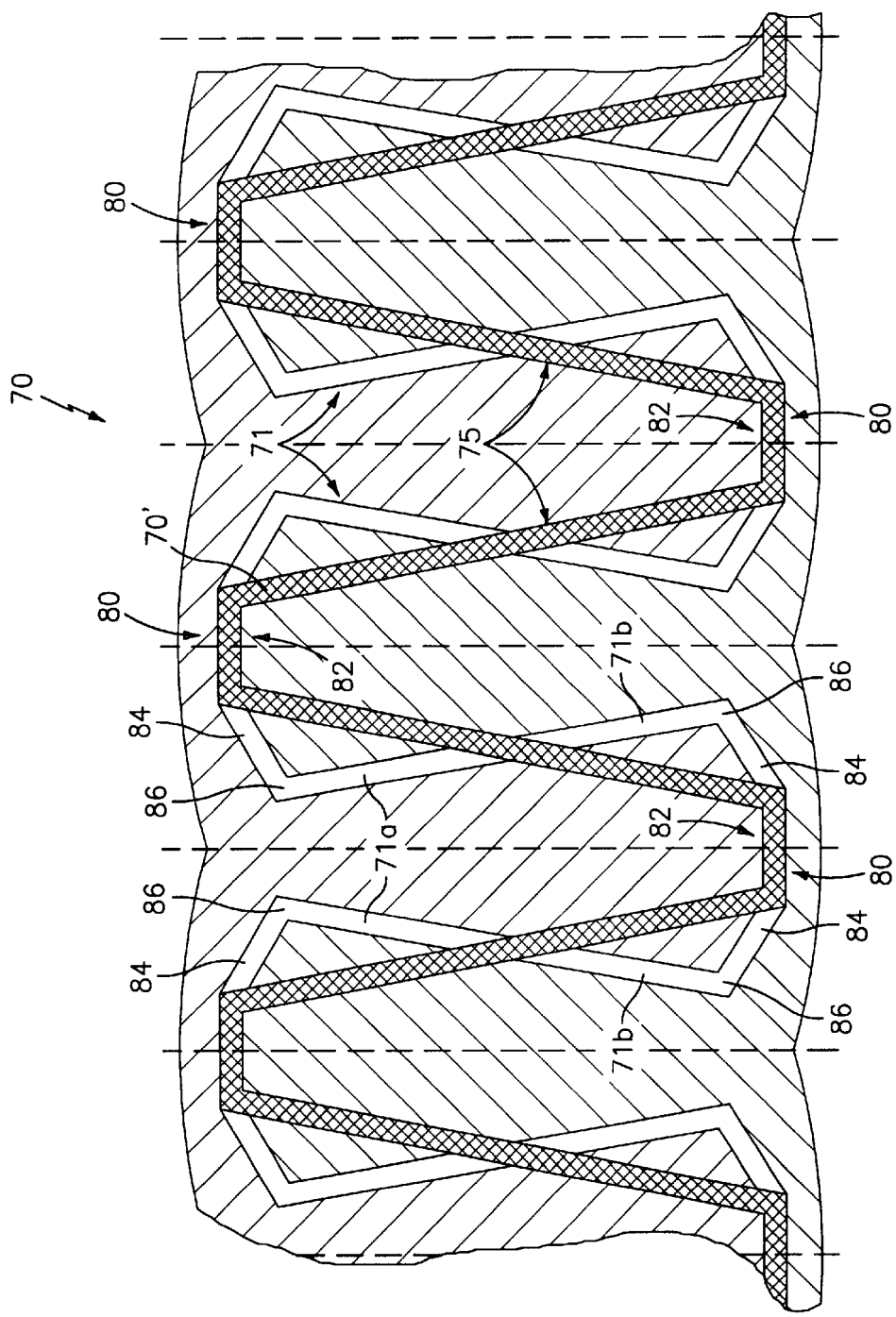

Turning to FIG. 22, a further configuration of a filter 70 is provided wherein walls 75 are folded to a more dense structure, which can be advantageous so as to provide additional filter surface area in the same volume of a filter pack. In order to accomplish this, as in the embodiment of FIG. 21, adhesive must be applied at varying thicknesses or heights between embossings 71. Nevertheless, the resulting filter is a filter within the broad scope of the present invention and provides enhanced structural strength and reliability.

It should also readily be appreciated that, as described above, various combinations of asymmetric embossings and/or folding of walls 75 can be manipulated so as to provide filters having round or other shapes, for example to make an air filter for automotive applications and the like.

It should be further apparent that the various embodiments of the present invention provide for enhanced strength in filter structure and more efficient application of adhesive in various embodiments to allow for savings in adhesive, enhanced filter surface area and the like.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A fluid filter element, comprising an embossed flat filter material which is folded so as to define a plurality of substantially adjacent walls, each wall defining a planar surface between two adjacent fold lines, said wall having an embossing comprising a first embossing portion which extends from one side of said wall and a second embossing portion which is adjacent to and aligned with said first embossing portion and which extends from the other side of said wall, and an adhesive connecting adjacent embossings of adjacent walls.

2. The filter element of claim 1, further comprising additional embossings between said embossings which are connected with said adhesive.

3. The filter element of claim 2, wherein said additional embossings comprise substantially continuous grooves for stiffening said walls.

4. The filter element of claim 3, wherein said additional embossings are substantially parallel to said embossings.

5. The filter element of claim 1, wherein said adhesive has a substantially constant height.

6. The filter element of claim 1, wherein said adhesive is selected from the group consisting of adhesive threads positioned along said embossings, adhesive spots positioned along said embossings, and combinations thereof.

7. The filter element of claim 1, wherein adjacent embossings are substantially parallel.

8. The filter element of claim 1, wherein adjacent embossings are substantially uniformly spaced.

9. The filter element of claim 1, wherein said first embossing portion and said second embossing portion define a transition axis therebetween, and wherein said transition axis is an axis of symmetry between said first embossing portion and said second embossing portion.

10. The filter element of claim 1, wherein said first embossing portion and said second embossing portion define a transition axis therebetween, and wherein said transition axis is asymmetrically positioned between said first and said second embossing portions.

11. The filter element of claim 1, wherein said adhesive is interrupted at inner fold edges defined between said walls.

12. The filter element of claim 1, wherein additional adhesive is applied to outer fold edges defined by said walls.

13. The filter element of claim 1, wherein said adhesive is provided on both sides of said filter material.

14. The filter element of claim 1, wherein said filter material defines spaces between said walls opening in alternating opposite directions, wherein openings in one direction define an upstream side and openings in the other direction define a downstream side, wherein adhesive between embossings on walls opening on said upstream side is applied in spots and adhesive between embossings on walls opening in said downstream side is substantially continuous.

15. The filter element of claim 1, wherein said filter material defines spaces between said walls opening in alternating opposite directions, wherein openings in one direction define an upstream side and openings in the other direction define a downstream side, wherein adhesive is applied only between embossings on walls opening in said downstream side.

16. The filter element of claim 1, wherein said walls define wall edges each having at least two fold lines.

17. The filter element of claim 1, wherein said embossings further comprise end embossing portions extending from opposed ends of said first and second embossing portions, said end embossing portions returning to a plane of said walls.

18. The filter element of claim 1, wherein said embossings are formed in alternating sequence such that first embossing portions of adjacent embossings are adjacent to each other.

19. The filter element of claim 1, wherein said adhesive is a hot melt adhesive.

20. The filter element of claim 1, wherein said first embossing portion and said second embossing portion are substantially co-linear.

21. A method for forming a fluid filter element, comprising the steps of:
   providing a flat filter material;
   forming a plurality of substantially parallel embossings in said material, said embossings comprising alternating first and second embossing portions, said first embossing portions extending from one side of said material and said second embossing portions aligned with said first embossing portions and extending from the other side of said material;
   applying an adhesive to at least a portion of said embossings; and
   folding said material in a zig-zag pattern so as to define walls of said material, each wall having said alternating first and second embossing portions, wherein said adhesive bonds said embossings of adjacent walls together.

22. The method of claim 21, wherein said folding step positions said walls so that embossings of adjacent walls are substantially parallel.

23. The method of claim 21, wherein said applying step comprises applying a substantially constant amount of adhesive to said material per unit length of material.

24. The method of claim 21, wherein said applying step is selected from the group consisting of applying said adhesive as a continuous thread, applying said adhesive in spots, and combinations thereof.

25. The method of claim 21, wherein said first and second embossing portions are substantially co-linear.

* * * * *